(12) United States Patent
Koda et al.

(10) Patent No.: US 6,520,105 B2
(45) Date of Patent: Feb. 18, 2003

(54) REMOTE CONTROL UNMANNED FISHING BOAT AND DEVICE FOR REMOTE CONTROL THEREOF

(75) Inventors: Yoshiharu Koda, Tokyo (JP); Kojiro Koda, Tokyo (JP)

(73) Assignee: Coden Co., Ltd., Tokyo (JP)

( * ) Notice: Subject to any disclaimer, the term of this patent is extended or adjusted under 35 U.S.C. 154(b) by 0 days.

(21) Appl. No.: 09/907,431

(22) Filed: Jul. 17, 2001

(65) Prior Publication Data

US 2001/0039910 A1 Nov. 15, 2001

Related U.S. Application Data

(63) Continuation-in-part of application No. 09/493,912, filed on Jan. 28, 2000, now abandoned.

(30) Foreign Application Priority Data

Jan. 29, 1999 (JP) .............................................. 11-22708
Dec. 9, 1999 (JP) ............................................ 11-350536

(51) Int. Cl.⁷ ................................................ B63B 35/14
(52) U.S. Cl. ........................................ 114/255; 43/26.1
(58) Field of Search ........................... 114/21.2, 144 A, 114/144 R, 255; 43/26.1; 446/163; 73/178 R; 440/54; 340/447

(56) References Cited

U.S. PATENT DOCUMENTS

| 2,582,015 A | * | 1/1952 | Duncan, Jr. ................. 114/255 |
| 3,203,131 A | | 8/1965 | Myers ......................... 43/26.1 |
| 3,710,500 A | | 1/1973 | Pena ........................... 43/17.5 |
| 3,911,609 A | * | 10/1975 | Baya ............................ 43/26.1 |
| 4,161,077 A | | 7/1979 | Ciaccio et al. ............... 43/26.1 |
| 4,253,165 A | | 2/1981 | Christiansen ................ 367/96 |
| 4,270,307 A | | 6/1981 | Arigaya ....................... 46/254 |
| 4,339,811 A | | 7/1982 | Bednarz et al. ............... 367/96 |
| 4,339,888 A | | 7/1982 | Sheng-Jung ................. 43/26.1 |
| 4,442,621 A | | 4/1984 | Kent ........................... 43/26.1 |
| 4,446,729 A | | 5/1984 | Watson, III ................ 73/178 R |
| 4,757,633 A | | 7/1988 | Van Cleve .................... 43/26.1 |
| 4,856,222 A | | 8/1989 | Hannam ..................... 43/26.1 |
| 5,077,929 A | * | 1/1992 | Khan ........................... 43/26.1 |
| 5,086,581 A | | 2/1992 | Barra et al. ................... 43/26.1 |
| 5,109,213 A | | 4/1992 | Williams ..................... 340/447 |
| 5,154,016 A | | 10/1992 | Fedora et al. ................ 43/26.1 |
| 5,165,193 A | | 11/1992 | Dankwardt .................. 43/26.1 |
| 5,201,884 A | | 4/1993 | Nichols ....................... 43/26.1 |

(List continued on next page.)

FOREIGN PATENT DOCUMENTS

| FR | 2666198 | 3/1992 |
| JP | 02113839 | 4/1990 |
| JP | 11300055 | 11/1999 |

*Primary Examiner*—S. Joseph Morano
*Assistant Examiner*—Lars A. Olson
(74) *Attorney, Agent, or Firm*—Richard C. Woodbridge, Esq.; Stuart H. Nissim, Esq.; Woodbridge & Associates, P.C.

(57) ABSTRACT

This invention concerns a remote control unmanned fishing boat intended for enjoyment of remote control fishing and a remote control device for use with the boat.

The invention contemplates enabling the operator to advance the boat forward and backward and change the direction of the advance of the boat by manipulating the remote control device 2. By the operator using the remote control device 2 for actuating a depth sounder, the information concerning the depth of water and the condition of water bottom determined by the depth sounder is displayed on a monitor 41 of the remote control device 2. When the optimum position for fishing is found consequently, the operator is allowed to lower his fishhook in the water by manipulating the remote control device 2.

36 Claims, 19 Drawing Sheets

U.S. PATENT DOCUMENTS

| | | | |
|---|---|---|---|
| 5,293,712 A | 3/1994 | Lo | 43/26.1 |
| 5,309,664 A | 5/1994 | Wright | 43/26.1 |
| 5,361,530 A | 11/1994 | Kashani et al. | 43/26.1 |
| 5,363,587 A | 11/1994 | Nordling | 43/26.1 |
| 5,397,255 A | 3/1995 | Heer | 440/54 |
| 5,453,035 A | 9/1995 | Jenkins | 446/163 |
| 5,581,932 A | 12/1996 | Bell | 43/26.1 |
| 5,806,232 A | 9/1998 | James | 43/26.1 |
| 6,041,537 A * | 3/2000 | Sullivan | 114/255 |

* cited by examiner

REMOTE CONTROL UNMANNED FISHING BOAT AND DEVICE FOR REMOTE CONTROL THEREOF

RELATED APPLICATION

This application is a continuation-in-part of application Ser. No. 09/493,912, filed Jan. 28, 2000, now abandoned.

BACKGROUND OF THE INVENTION

1. Field of the Invention

This invention relates to a remote control unmanned fishing boat for deriving enjoyment of remote control fishing and a device for remote control thereof.

2. Description of the Prior Art

The conventional fishing grade depth sounder or fish finder is constructed by mounting a monitor on a manned fishing boat, attaching a depth sounding section or a fish finding section to a buoy installed on the water surface, and connecting the depth sounding section or the fish finding section with a wire to the monitor and is operated by displaying a water depth or a shoal of fish in the area surrounding the buoy on the monitor.

Since the monitor is connected with a wire to the depth sounding section or the fish finding section, however, an angler on the boat experiences difficulty in finding on the monitor the depth of water or the shoal of fish at a place separated far from him.

The buoy has no power of its own and, therefore, is incapable of moving arbitrarily the depth sounding section or the fish finding section to a required position.

Even when the angler is enabled by the monitor to confirm the depth of water or the shoal of fish, it is very difficult for him to drop a fishing line at the optimum position by consulting the display on the monitor.

SUMMARY OF THE INVENTION

This invention has for an object thereof the provision of a remote control unmanned fishing boat which permits detection of the depth of water or the shoal of fish at a place separated far from the angler, allows arbitrary change of the place of detection, and enables the angler to drop his fishing line at the optimum position and a remote control device therefor.

This invention constructs the remote control fishing boat with a depth sounder for measuring the depth of water, a first transmitter for transmitting the information concerning the depth of water and the condition of water bottom measured by the depth sounder through the medium of specific radio wave, a propelling power source for propelling a boat, a steering device for steering the boat, a setting device for freely detachably setting a fishing line, and a first receiver for receiving a specific radio wave concerning the operation of the depth sounder, the propelling power source, the steering device, and the setting device and operating the devices in response to the radio wave.

This invention constructs the remote control device for the boat mentioned above with a second transmitter for transmitting to the first receiver mentioned above a specific radio wave concerning the operation of the depth sounder, the propelling power source, the steering device, and the setting device, operating signal generating device for emitting to the second transmitter an operating signal concerning the depth sounder, the propelling power source, the steering device, and the setting device, a second receiver for receiving from the first transmitter a specific radio wave containing the information concerning the depth of water and the condition of water bottom, and a monitor for displaying the depth of water and the condition of water bottom based on the signal received by the second receiver.

In accordance with this invention, the operator using the remote control device as on the coast is enabled to move the boat on the water surface forward or backward by transmitting the specific radio wave concerning the operation of the propelling power source and, at the same time, change the direction of the boat by transmitting the specific radio wave concerning the operation of the steering device.

Further, the operator, by making the remote control device transmit the signal for operating the depth sounder and actuate the depth sounder, is enabled to emit from the first transmitter the information concerning the depth of water and the condition of water bottom to be detected consequently. In consequence of the transmission of the information concerning the depth of water and the condition of water bottom to the remote control device, the monitor displays thereon how deep the water is directly below the boat and in what condition the water bottom is.

The operator moves the boat while viewing the monitor screen and, on detecting the optimum position for the boat, sets the remote control device producing an operation of transmitting the specific radio wave concerning the operation of the setting device and actuating the setting device to lower the fishing line at that position.

DETAILED DESCRIPTION OF THE INVENTION

Now, this invention will be described in detail below with reference to the diagrams illustrating one preferred embodiment.

Figure 1:
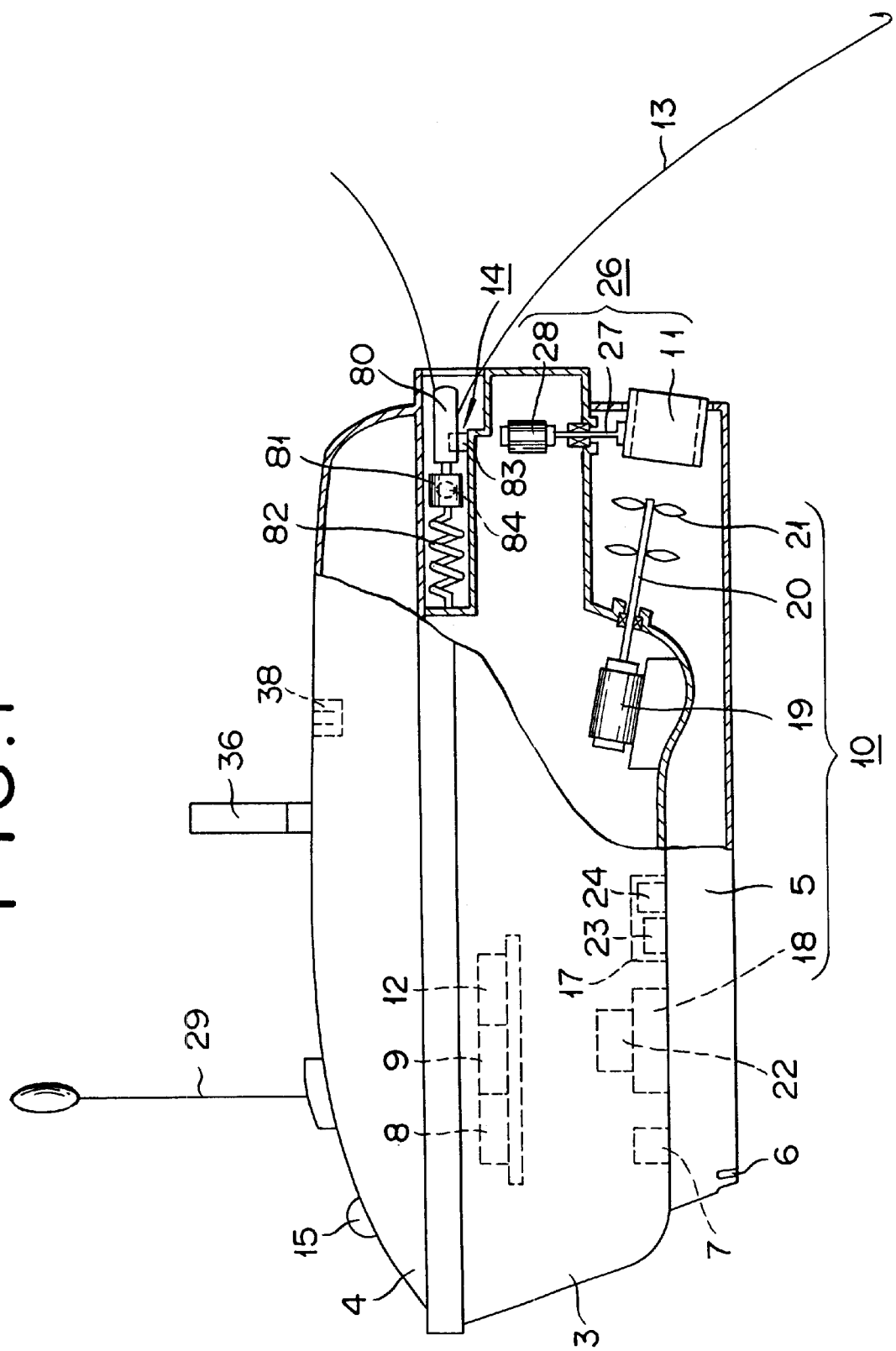
FIG. 1 is a structural diagram schematically illustrating a remote control unmanned fishing boat according to this invention.
Figure 2:
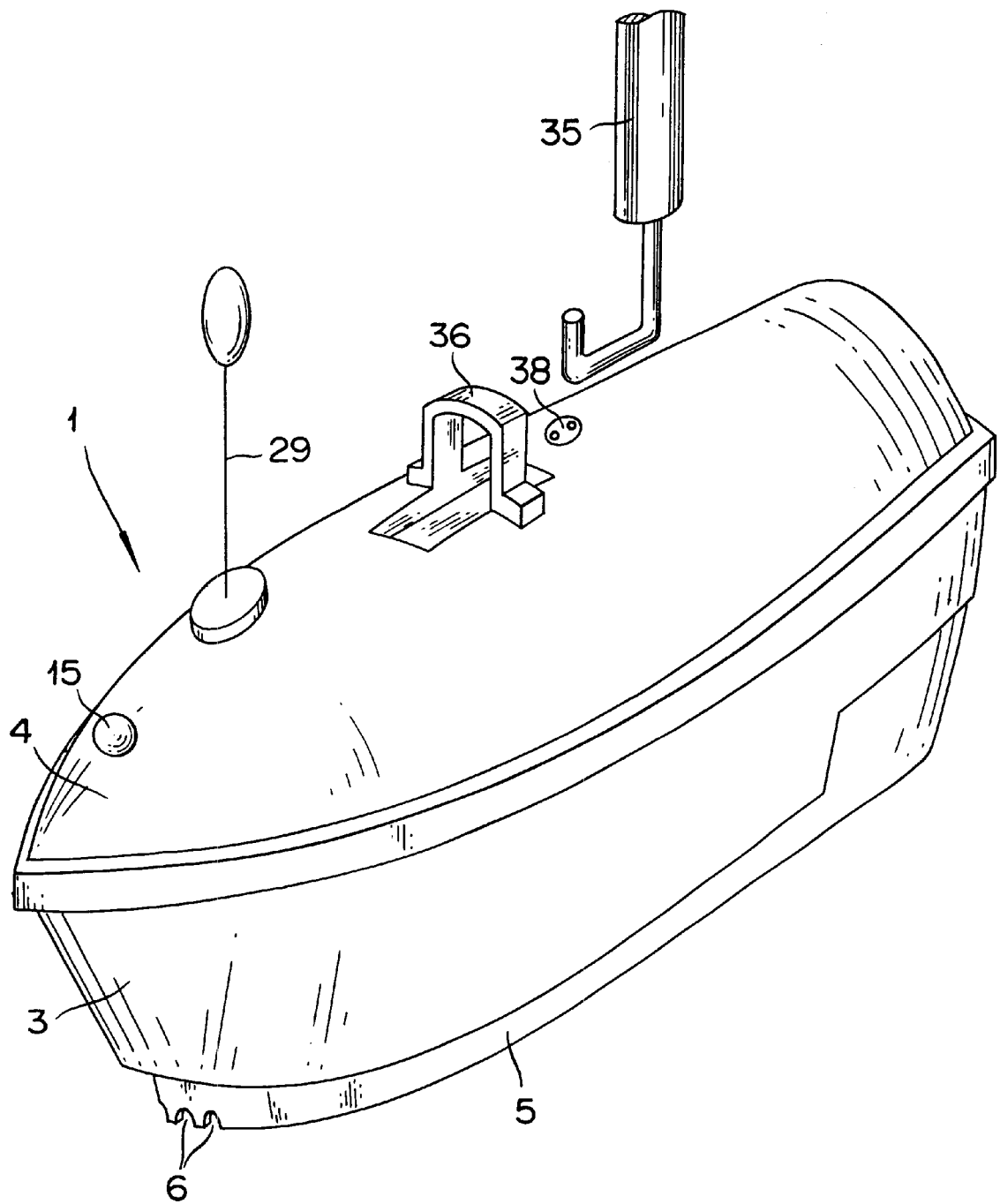
FIG. 2 is a perspective view of the remote control unmanned fishing boat according to this invention.
Figure 3:
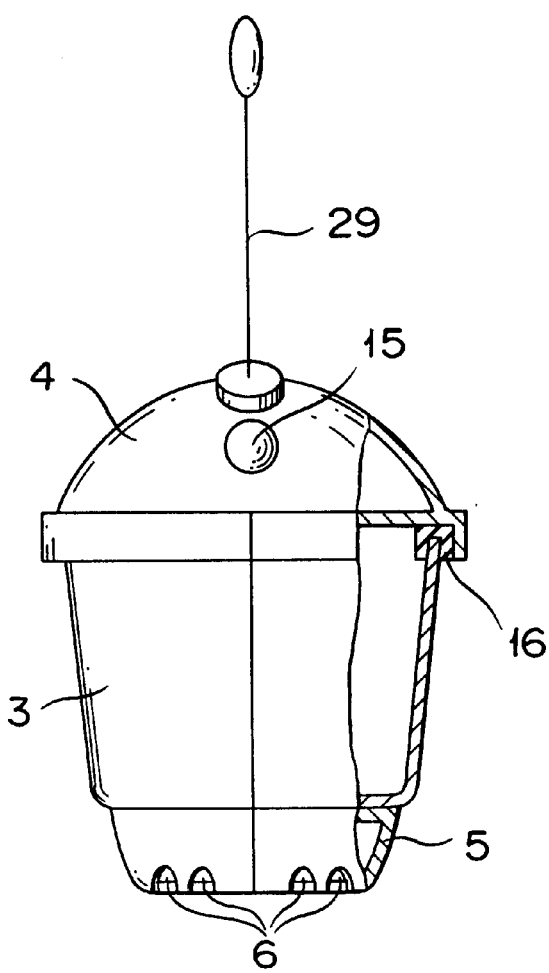
FIG. 3 is a front view of the remote control unmanned fishing boat according to this invention.
Figure 4:
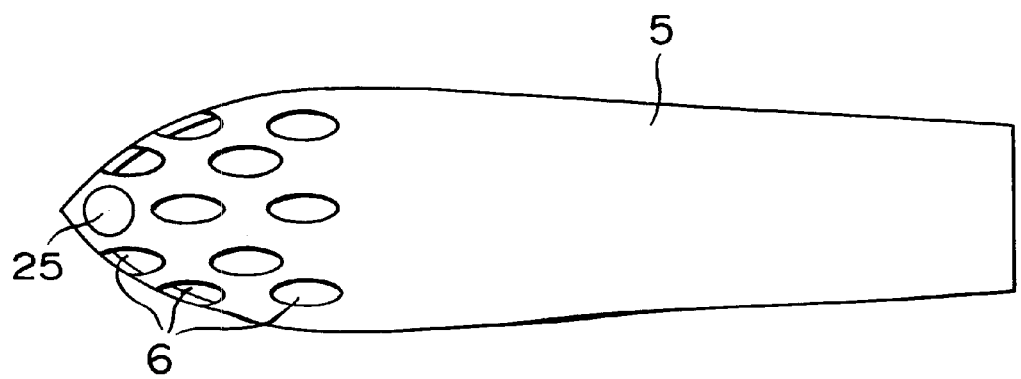
FIG. 4 is an end view of a ship bottom cover as seen from the bottom side.

FIG. 1 is a structural diagram schematically illustrating the remote control unmanned fishing boat according to this invention, FIG. 2 is a perspective view of this boat, FIG. 3 is a front view of this boat, and FIG. 4 is an end view of a ship bottom cover as seen from the bottom side thereof.

As illustrated in FIG. 1, a boat 1 is composed of the lower section of a hull 3, the upper section of a hull 4, and a ship bottom cover 5 attached to the lower section of the hull 3. The lower section of the hull 3 and the upper section of the hull 4 are adapted to be separated as illustrated in FIG. 3 and the lower section of the hull 3 and the upper section of the hull 4 are joined in a watertight form through the medium of a packing 16. The ship bottom cover 5 is so fitted as to prevent a screw 21 from being entangled with such floating matter as seaweed and waste. In the front section of the ship bottom cover 5, a plurality of intakes 6 for admitting water as illustrated in FIG. 4 and a hole 25 for passing the ultrasonic wave of an ultrasonic wave transmitter-receiver 7 which will be specifically described herein below are opened. The rear section of the ship bottom cover 5 is so opened as to cover the screw 21 and a cylindrical rudder 11.

On the front side of the lower section of the hull 3, an ultrasonic wave transmitter-receiver 7 for sounding the depth of water and a radio receiver 9 and a radio transmitter 8 for jointly transmitting the signal issued from the ultrasonic wave transmitter-receiver 7 to a remote control device 2 which will be specifically described herein below meanwhile controlling the operation of the ultrasonic wave transmitter-receiver 7. The ultrasonic wave transmitter-receiver 7 concurrently functions as a depth sounder or a fish shoal detector, the radio receiver 9 as a first receiver, and the radio transmitter 8 as a first transmitter respectively.

On the rear side of the lower section of the hull 3, a propelling power source 10, a steering device 26 provided with the cylindrical rudder 11 steered by a motor 28 through the medium of a shaft 27, and a radio transmitter-receiver 12 for operating the propelling power source 10 and the steering device 26 with a specific radio wave are disposed. In the lattermost part of the lower section of the hull 3, a setting device 14 for freely detachably setting a fishing line 13 is provided and this setting device 14 is adapted to be operated by a radio transmitter-receiver 12. The radio transmitter-receiver 12 is further capable of enabling to detect the catch of fish on the fishing line 13 of the setting device 14 and transmitting the information of this catch. Incidentally, the radio transmitter-receiver 12, like the radio receiver 9, concurrently functions as the first receiver.

The lower section of the hull 3 is further provided with a position information emitting device 17 for emitting the information concerning the position of the boat 1 and the direction of advance thereof with a specific radio wave. The position information emitting device 17 detects the direction of advance and the position of the boat 1. The position information emitting device 17 is furnished with an advance direction detecting device 23 for detecting the direction of advance of the boat 1 and a position detecting device 24 for detecting the position of the boat 1.

To the upper section of the hull 4 is attached a display lamp 15 which enables the operator engaging in remote controlling the boat 1 even at night to recognize the boat 1 with an unaided eye. This display lamp 15 is a LED or a lamp which may be fitted to the leading end of an antenna 29 (FIG. 2) or a lifting handle 36 (FIG. 2).

The propelling power source 10 is composed of a battery 18 disposed in the generally central part of the lower section of the hull 3 of the boat 1, a motor 19 driven by this battery 18, a screw 21 attached to the exterior of the boat 1 through the medium of a shaft 20 of the motor 19, and the ship bottom cover 5 mentioned above. To the battery 18 is connected a battery detector 22 for detecting the residue thereof. The result of the detection can be emitted by the radio transmitter-receiver 12.

FIG. 2 is a perspective view of the remote control unmanned fishing boat contemplated by the present invention.

To the upper section of the hull 4, the antenna 29 adapted to receive the radio wave from the remote control device which will be specifically described herein below and transmit the radio wave to the remote control device is attached.

FIG. 2 shows that the antenna 29 is standing on the upper section of the hull 4 by itself, but not limited to that form. The antenna 29 can be composed of soft linear material. In that case, the soft antenna 29 can be installed along the attachable/detachable pole (not shown) in order to send and to receive radio waves at a higher position than the hull of the boat. Namely, the longer the pole becomes, the higher the antenna 29 can be attached to the said pole. In other words, the position of the antenna sending/receiving radio waves becomes higher.

Therefore, the boat 1 can send and receive any radio wave by the antenna 29 attaching along the pole even if the boat itself is floating in the valley between marine waves. As the pole is attachable/detachable to the upper section of the hull 4, the antenna 29 never disturbs the transportation of the boat 1 if someone removes the pole and rounds the antenna 29.

Furthermore, as the pole makes the antenna 29 be attached only along itself, it can be installed easily on the hull by screws etc.

Since this boat 1 is very small, it is provided with the lifting handle 36 which is adapted to be hooked on the leading terminal section of a lifting bar 35 so that the boat may be easily pulled up by the lifting bar 35 as from a pier or a fishing boat. In the lower section of the hull 3, the battery 18 (FIG. 1) for feeding electric power to the relevant motors and transmitters and receivers is provided. On the upper section of the hull 4, a socket (watertight type) 38 to be used in charging the battery 18 is provided. The battery 18, therefore, is charged by the use of commercial power source through the medium of this socket 38.

Figure 5:
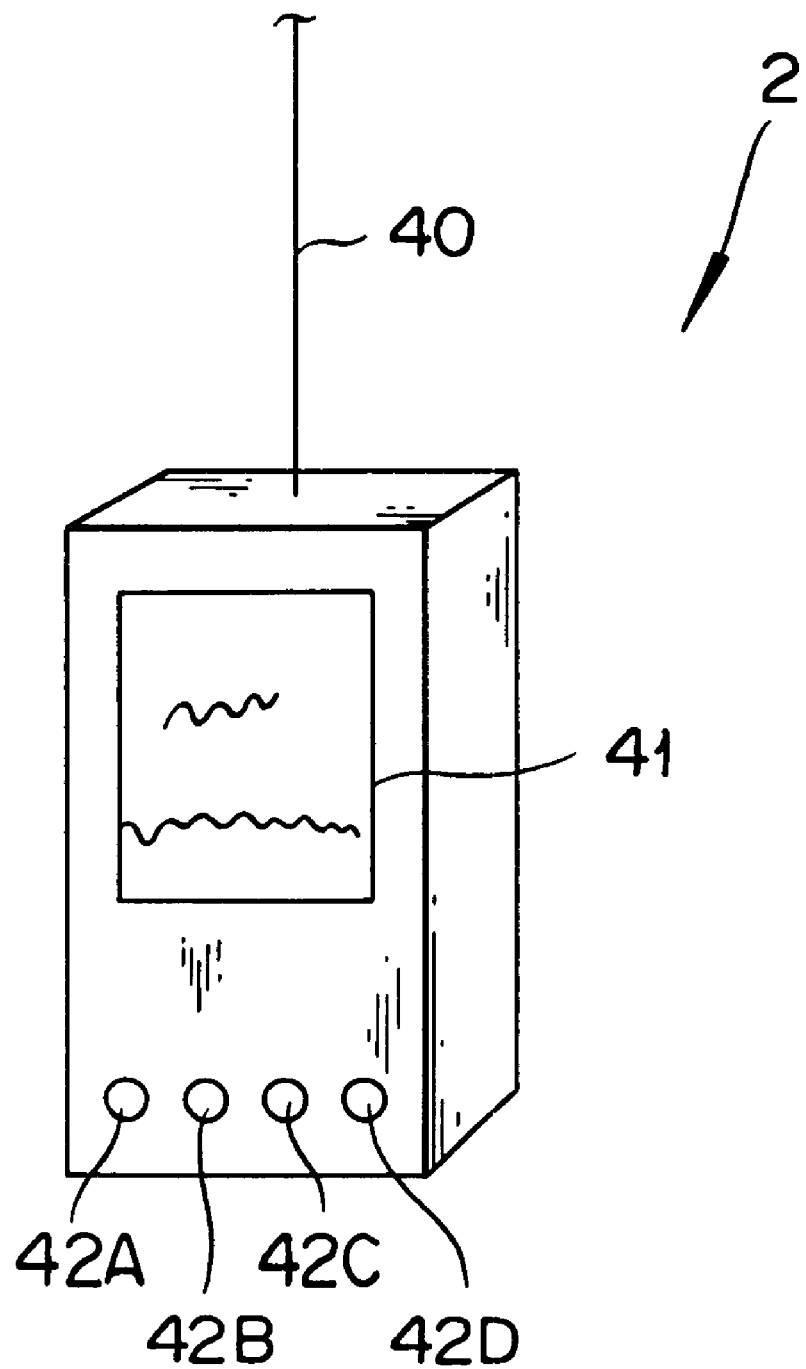
FIG. 5 is an external appearance of a remote control device for the remote control unmanned fishing boat according to the present invention.

FIG. 5 is an external appearance of the remote control device for remotely controlling the remote control unmanned fishing boat according to the present invention.

The remote control device 2 is provided with an antenna 40 for emitting a radio wave in the direction of the radio receiver 9 of the boat 1 and meanwhile receiving the radio wave from the radio transmitter 8, a monitor 41 for displaying the condition of water bottom and the position of a shoal of fish and meanwhile displaying the position of the boat 1 and the direction of advance thereof, an operating button 42A for emitting an operating signal to the ultrasonic wave transmitter-receiver 7 intended for depth sounding, an operating button 42B for emitting an operating signal for the propelling power source 10, an operating button 42C for emitting an operating signal for the steering device 26, and an operating button 42D for emitting an operating signal for the setting device 14.

Figure 6:
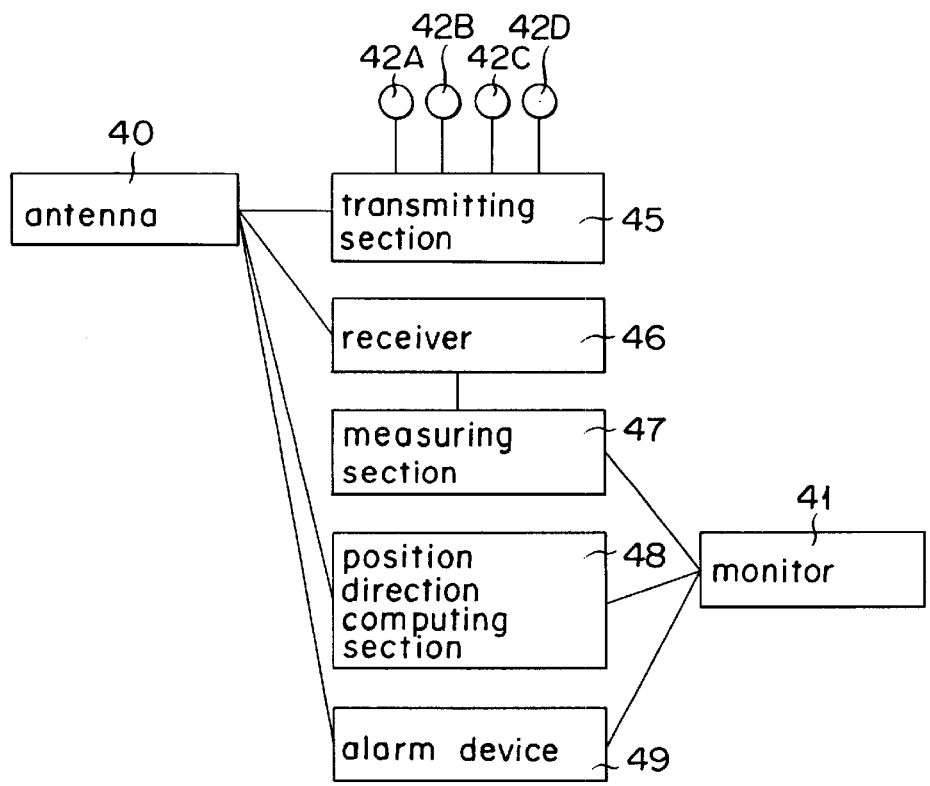
FIG. 6 is a block diagram illustrating the internal construction of the remote control device.
Figure 7:
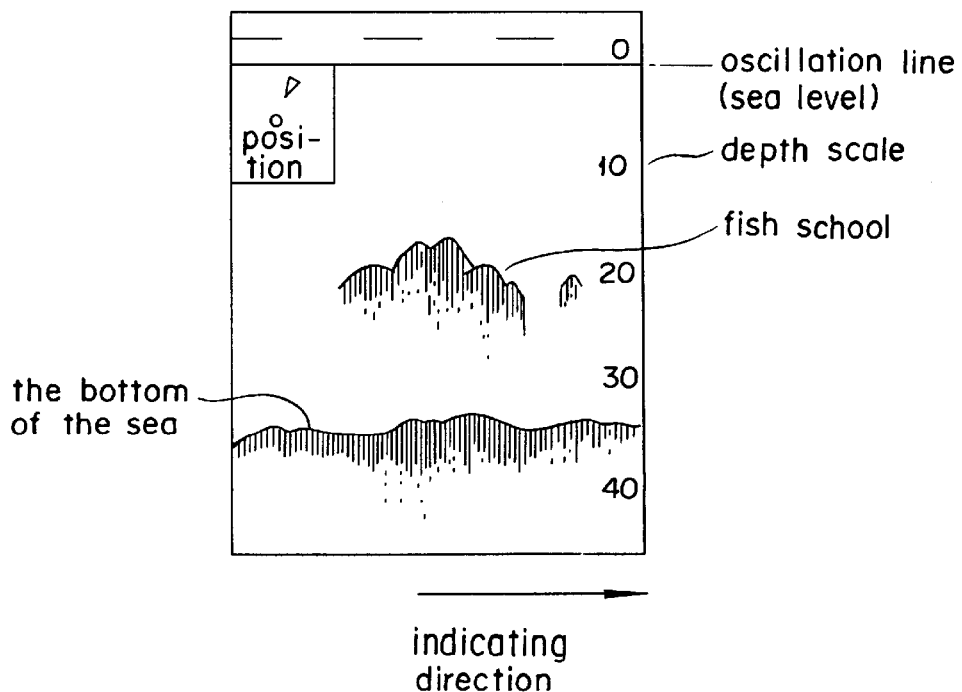
FIG. 7 is a diagram illustrating one example of the screen displayed on a monitor.

This remote control device 2 is provided in the interior thereof, as illustrated in FIG. 6, with a transmitting section 45 which controls the actions of the ultrasonic wave transmitter-receiver 7, the propelling power source 10, the steering device 26, and the setting device by exchanging messages with the ultrasonic wave transmitter-receiver 7, the radio receiver 9, and the radio transmitter-receiver 12 through the medium of the operating signals of the operating buttons 42A–42D, a receiver 46 for exchanging messages with the radio transmitter 8 and receiving the signal emitted from the radio transmitter 8, a depth sounding section 47 for measuring the depth of water or the shoal of fish based on the signal from the position information emitting device 17, a position direction computing section 48 for computing the position of the boat 1 and meanwhile computing the direction of advance of the boat 1 based on the signal from the position information emitting device 17, and an alarm device 49 for notifying the user of the outset of a load exerted on the fishing line or a decrease in the capacity of the battery. The results of the computations done by the measuring section 47 and the position direction computing section 48 are displayed by the monitor 41 as illustrated in FIG. 7, for example.

Figure 8:
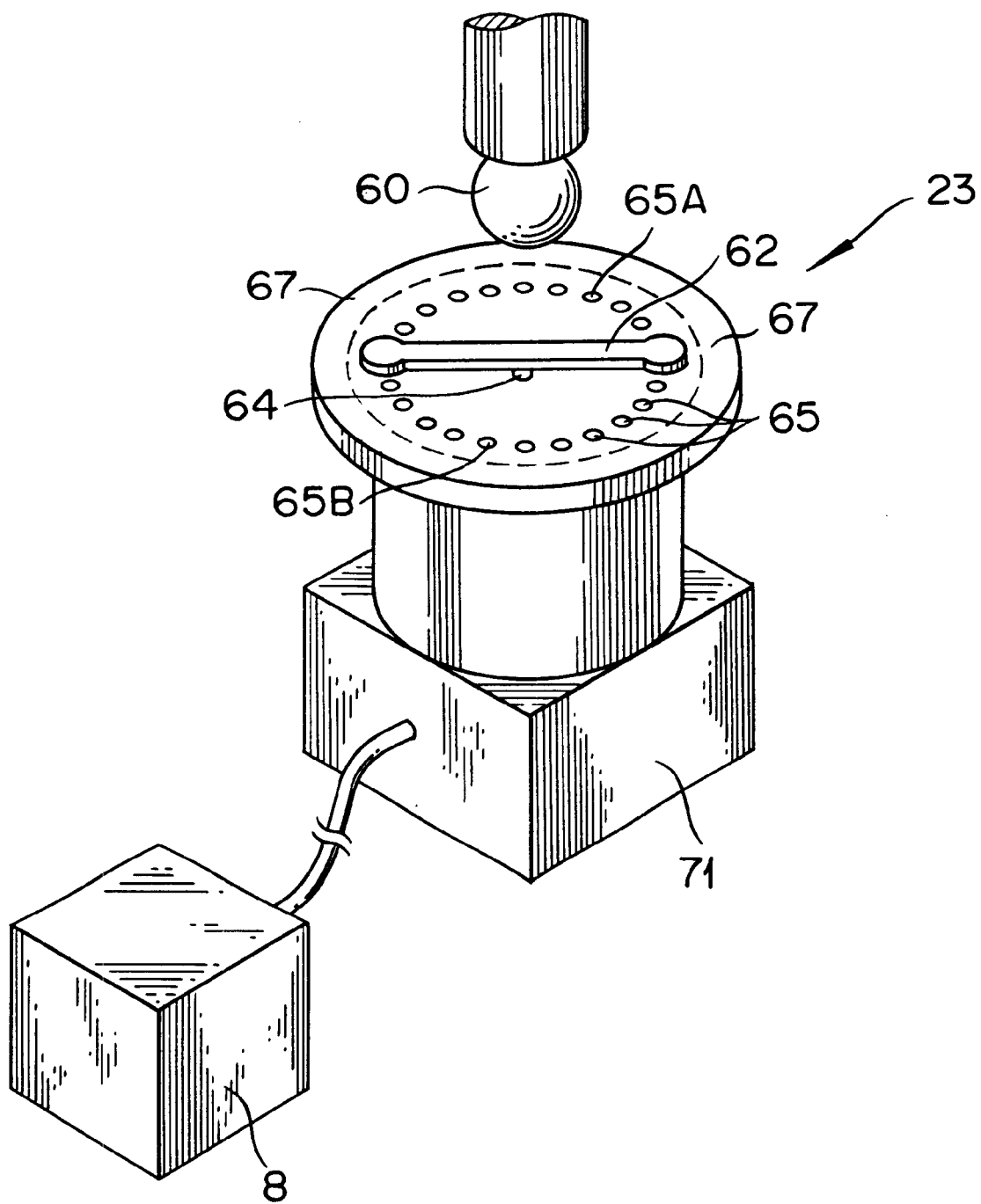
FIG. 8 is a perspective view of an advancing direction detecting device of a position information generating devices.
Figure 9:
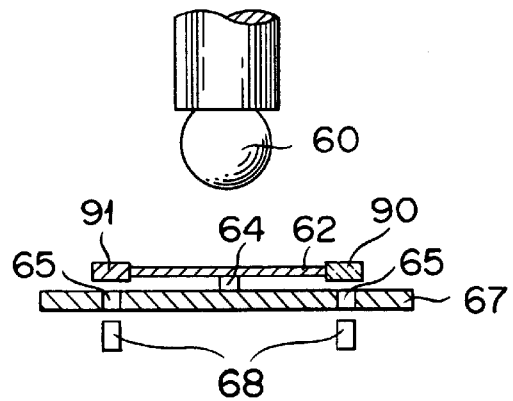
FIG. 9 is a cross section of the essential part of the advancing direction detecting device.

FIG. 8 is a perspective view of an advance direction detecting device 23 and FIG. 9 is a cross section of the advance direction detecting device 23.

This advance direction detecting device 23 is composed of a light source 60, a magnetic needle 62 possessed of an N pole and an S pole, a plate 67 having holes 65, 65, . . . opened at regular intervals on a circumference having a fixed radius from a supporting shaft 64 of the magnetic needle 62 as the center, and a position detecting circuit 71 for computing the direction of advance depending on the presence or absence of a beam of light through each of the holes 65 in the plate 67. The magnetic needle 62 constantly points to south and north under the influence of the geomagnetism. One of the leading terminal parts of the magnetic needle 62 is made of an opaque substance 91 and the other leading terminal part thereof is made of a transparent substance 90 and they are each shaped like a circle so as to intercept the light projected downward from the light source 60 and form shadows on the holes 65 positioned directly there below. The position detecting circuit 71, therefore, is capable of discerning the direction of advance of the boat 1 by detecting a hole which is thoroughly shaded by the opaque substance 91 and a hole which is slightly shaded by the transparent substance 90.

The plate 67 is firmly fixed on the lower section of the hull 3. It is so set that the magnetic needle 62 may shadow the holes 65A and 65B when the boat 1 is advancing in due north, for example. Once the directions to be used as standards and the positions of holes to be shadowed in the standard directions are fixed in advance as described above, the general direction of the advance of the boat 1 can be perceived by finding the holes which are shadowed at the time of observation. The position detecting circuit 71 finds which of the holes is shadowed by detecting the electric resistance of a photoconductor 68 which is located under the particular hole. This phenomenon is ascribable to the fact that the photoconductors 68 vary their electric resistance when they are exposed to the light and when they are hidden from the light. The position detecting circuit 71, by detecting the particular hole that reveals a conspicuously changed electric resistance, identifies the hole thus showing the conspicuous change of resistance as the hole shaded from the light by an opaque substance 91 (such as, for example, on the N pole side). Further, the position detecting circuit 71, by detecting the particular hole that reveals a slightly changed electric resistance, identifies the hole thus showing the slight change of resistance as the hole shaded slightly from the light by a transparent substance 90 (such as, for example, on the S pole side). Then, it discerns the direction of advance of the boat 1 by finding the numbers of holes by which the detected holes are separated from the standard hole (65A, for example). The direction of advance thus recognized by the position detecting circuit 71 is forwarded to the radio transmitter 8 and emitted therefrom as a radio wave. The direction of advance, therefore, can be confirmed by the monitor 41 of the remote control device 2.

Though this mode of embodiment, as depicted above, uses the photoconductor 68, such a light receiving element as a photodiode may be used instead.

Figure 10:
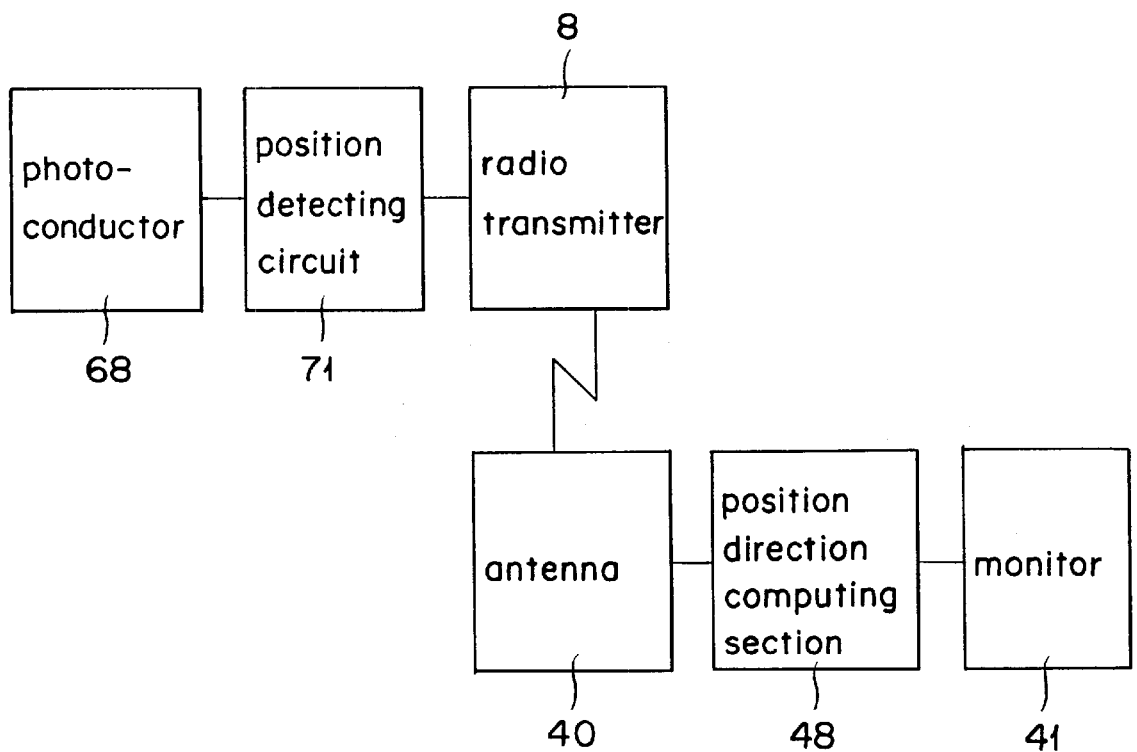
FIG. 10 is a block diagram illustrating the construction of the advancing direction detecting device and that of the remote control device.

FIG. 10 is a block diagram illustrating the construction of the advance direction detecting device 23 and the remote control device 2.

The advance direction detecting device 23 is provided with the photoconductor 68, the position detecting circuit 71, and the radio transmitter 8. The position detecting circuit 71 detects the position of the particular photoconductor 68 from among the plurality of photoconductors 68 that reveals a change in resistance. Further, the position detecting circuit 71 discerns the direction of advance of the boat 1 by the method described above based on the position of the photoconductor 68 showing the change in resistance. The signal concerning the direction of advance of the boat 1 is transmitted from the direction receiver 8 to the antenna 40 of the remote control device 2. The signal received by the antenna 40 is subjected to computation at the position direction computing section 48 and displayed as an image on the monitor 41.

Figure 11A:
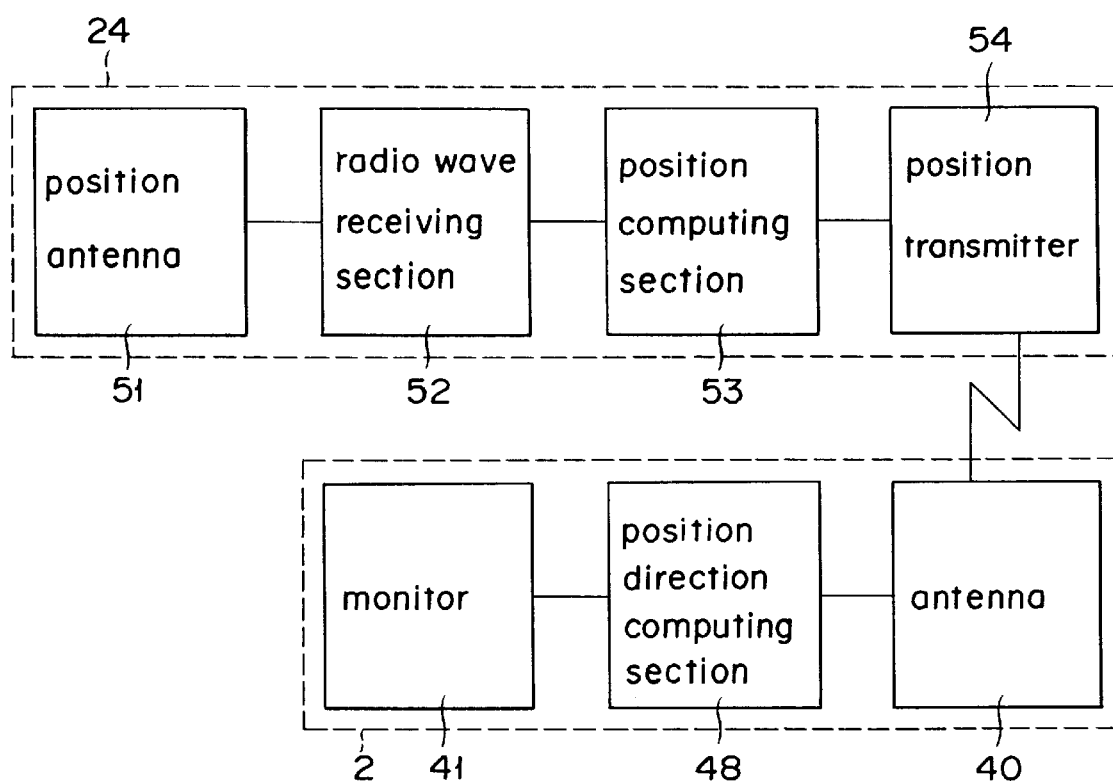
FIGS. 11A, 11B, 11C, 11D, 11E, 11F and 11G are block diagrams illustrating the construction of the position detecting device and that of the remote control device.

FIG. 11A is a block diagram illustrating the construction of a position detecting device 24 and the remote control device 2.

The detection of position in accordance with the position information emitting device 17 is attained on the same principle as the GPS(Global Positioning System) which is in general use.

The position detecting device 24 is provided with a position antenna 51, a radio wave receiving section 52, a position computing section 53, and a position transmitter 54. The remote control device 2 is provided with the antenna 40, a position direction computing section 48, and the monitor 41.

The position antenna 51 receives the radio wave of a satellite. The radio wave of the satellite is transmitted in the form of a signal to the position computing section 53 through the medium of the radio wave receiving section 52. The position computing section 53 computes the position of the boat 1 in accordance with the signal. The signal of the position found by the computation is transmitted from the position transmitter 54 to the antenna 40 of the remote control device 2. The signal received by the antenna 40 is subjected to computation in the position direction computing section 48 and displayed on the monitor 41.

Figure 11B:
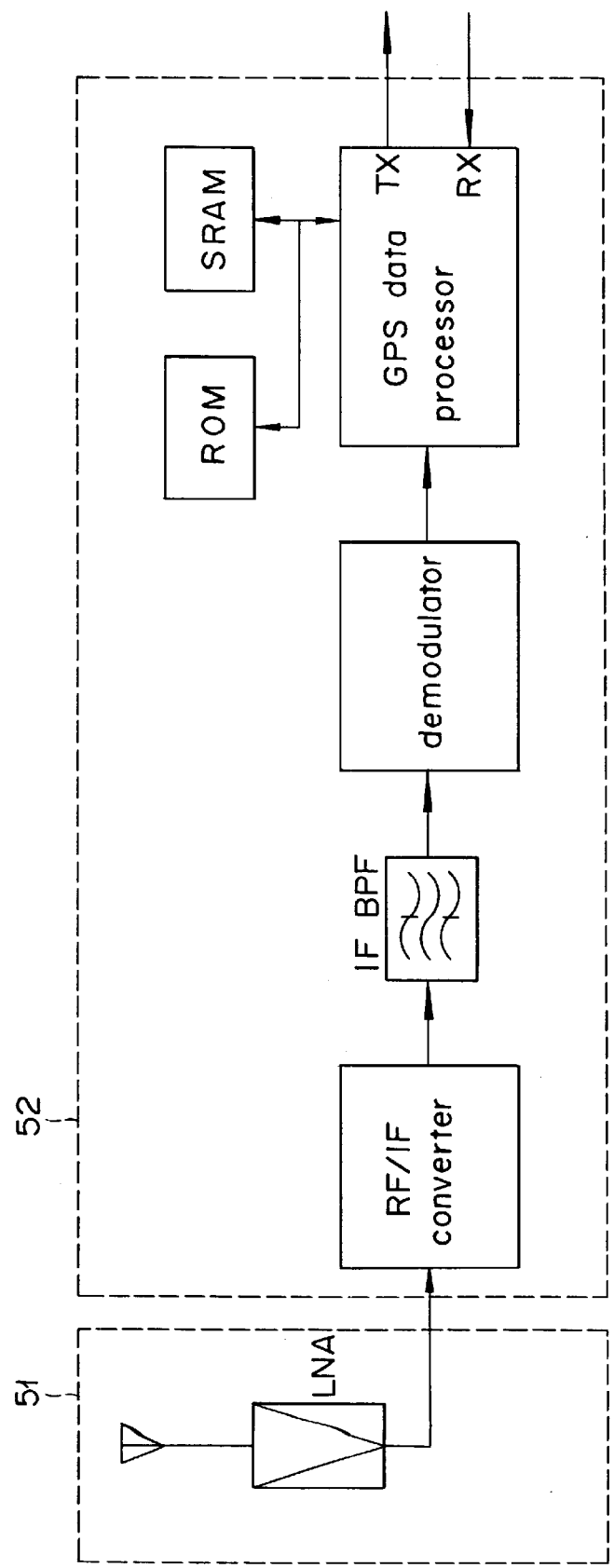

FIG. 11A shows more details of the position detecting device 24 and remote control unmanned device 2. FIG. 11B shows the concrete composition of position antenna 51 and the radio wave receiving section 52 of the position detecting device 24.

The position antenna 51 receives the radio wave of satellites. The received waves can be processed by GPS processor through RF/IF converter and demodulator. GPS data processed by GPS data processor are output to the position computing section 53 as serial data.

Figure 11C:
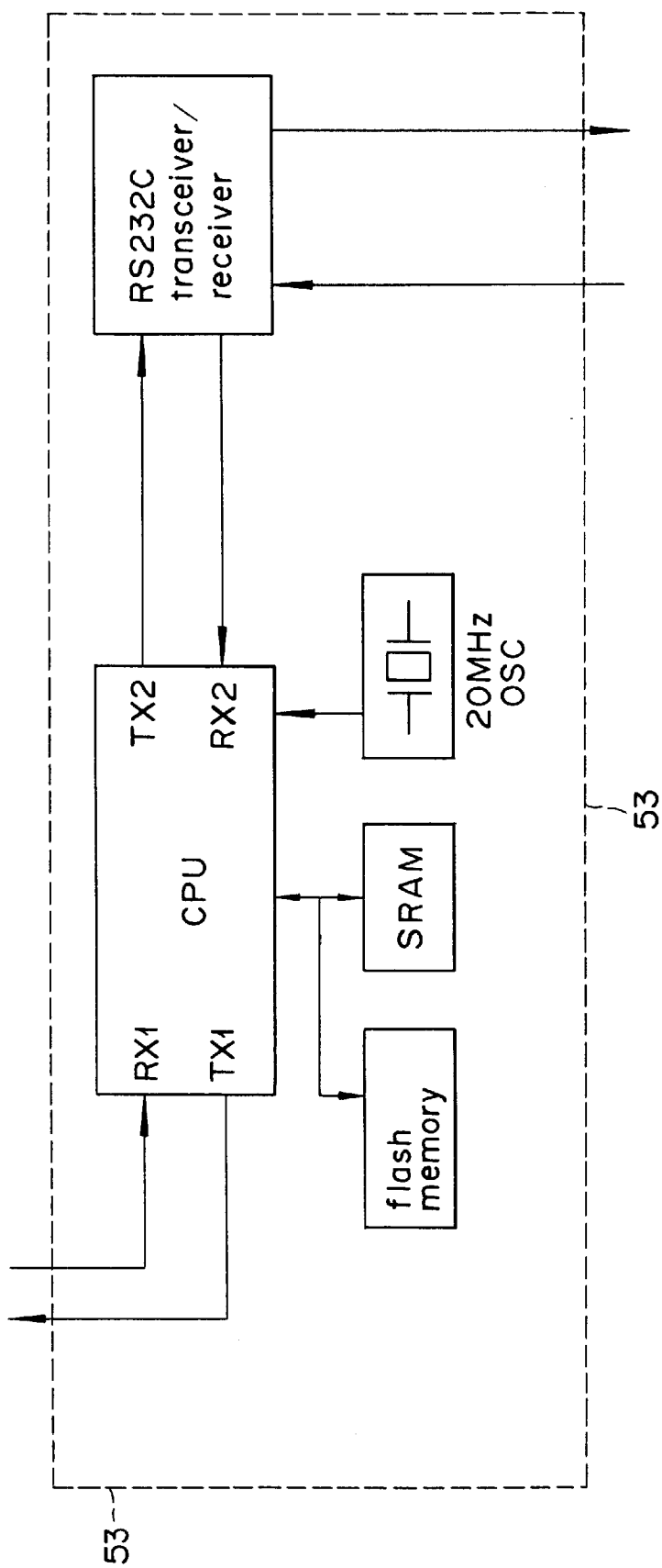

FIG. 11C is a block diagram that can show the concrete composition of the position computing section 53 the position computing section 53 can change GPS data which are input by GPS data processor, to wirelessly transmittable GPS data by CPU and wireless LAN. The processed GPS data are output by the position transmitter 54 through RS232C transceiver/receiver.

Figure 11D:
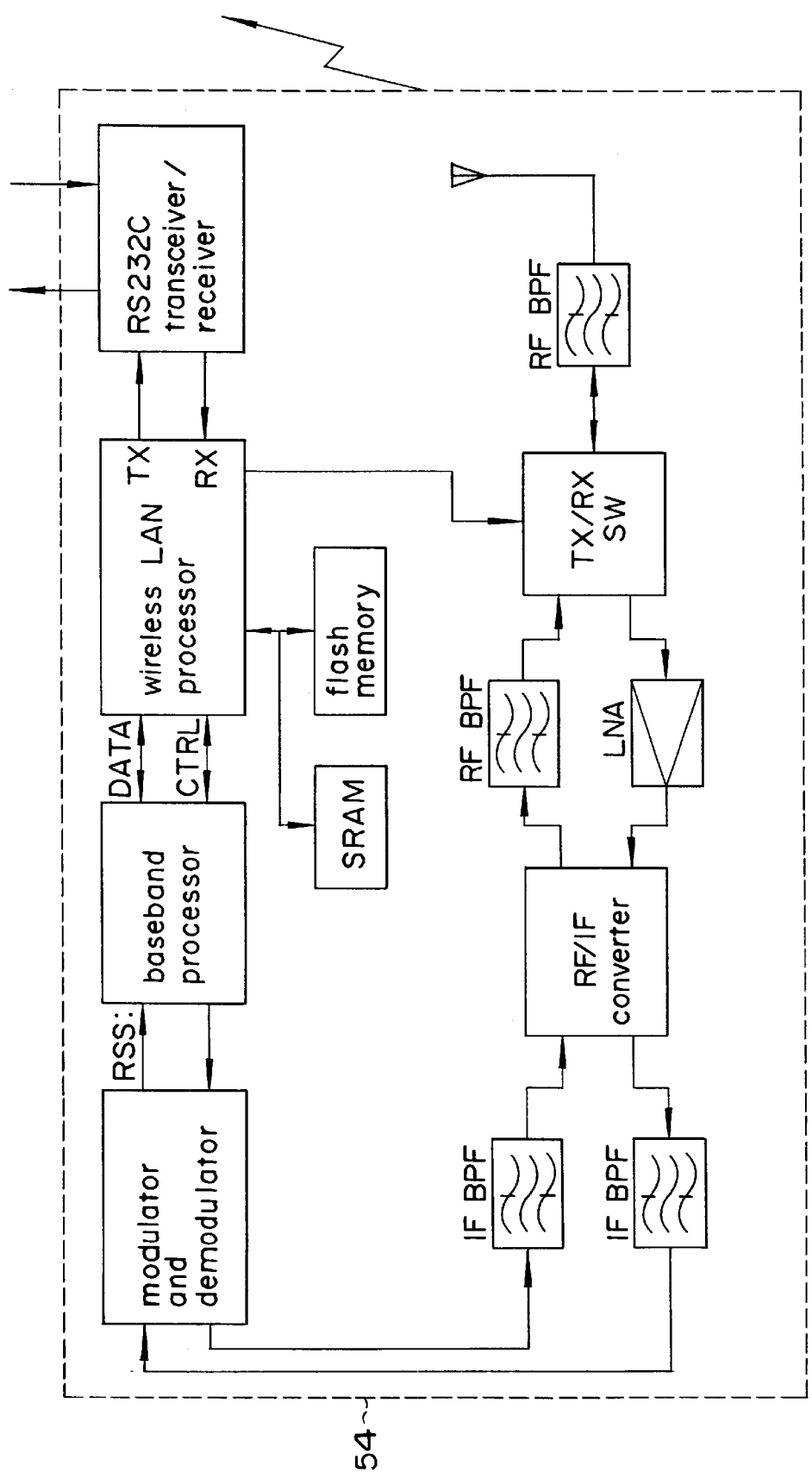

FIG. 11D is a block diagram that shows the concrete composition of the position transmitter 54. At the position transmitter 54, GPS data are input from the position computing section 53 to RS232C transceiver/receiver. The GPS data are stored at radio data packet by wireless LAN processor and baseband processor, and are sent to the remote control device 2 with 2.4 GHz through modulator and demodulator, RF?IF converter, TX/RX SF.

Figure 11E:
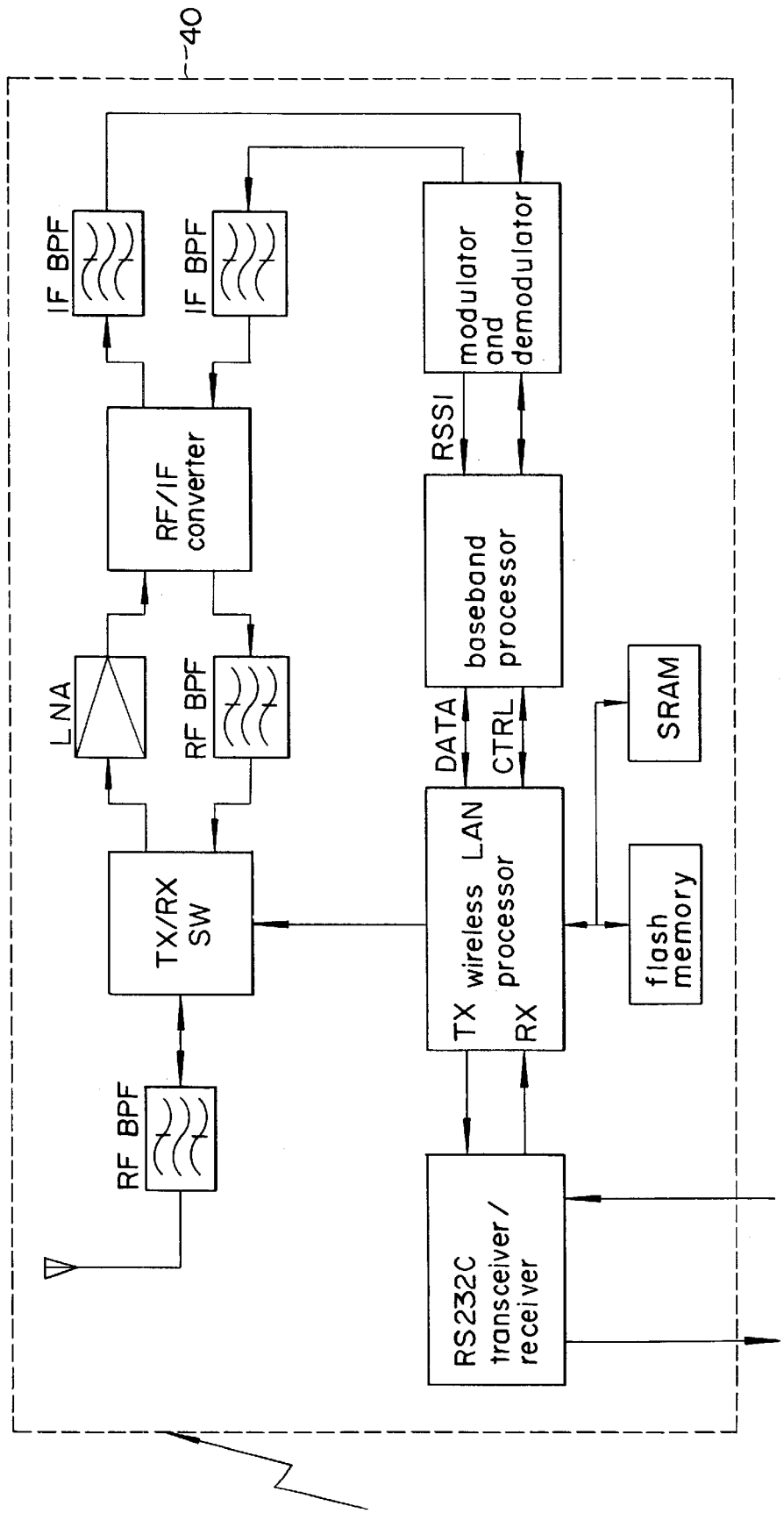

FIG. 11E is a block diagram that shows the concrete composition of the antenna 40 of the remote control device 2. the antenna 40 receives radio data packet from the position transmitter 54. From the received radio data packet, GPS data can be taken out by wireless LAN processor and baseband processor through TX/RX SW, RF/IF converter, and modulator and demodulator. The obtained GPS data are output from RS232C transceiver/receiver to the position direction computing section 48.

Figure 11F:
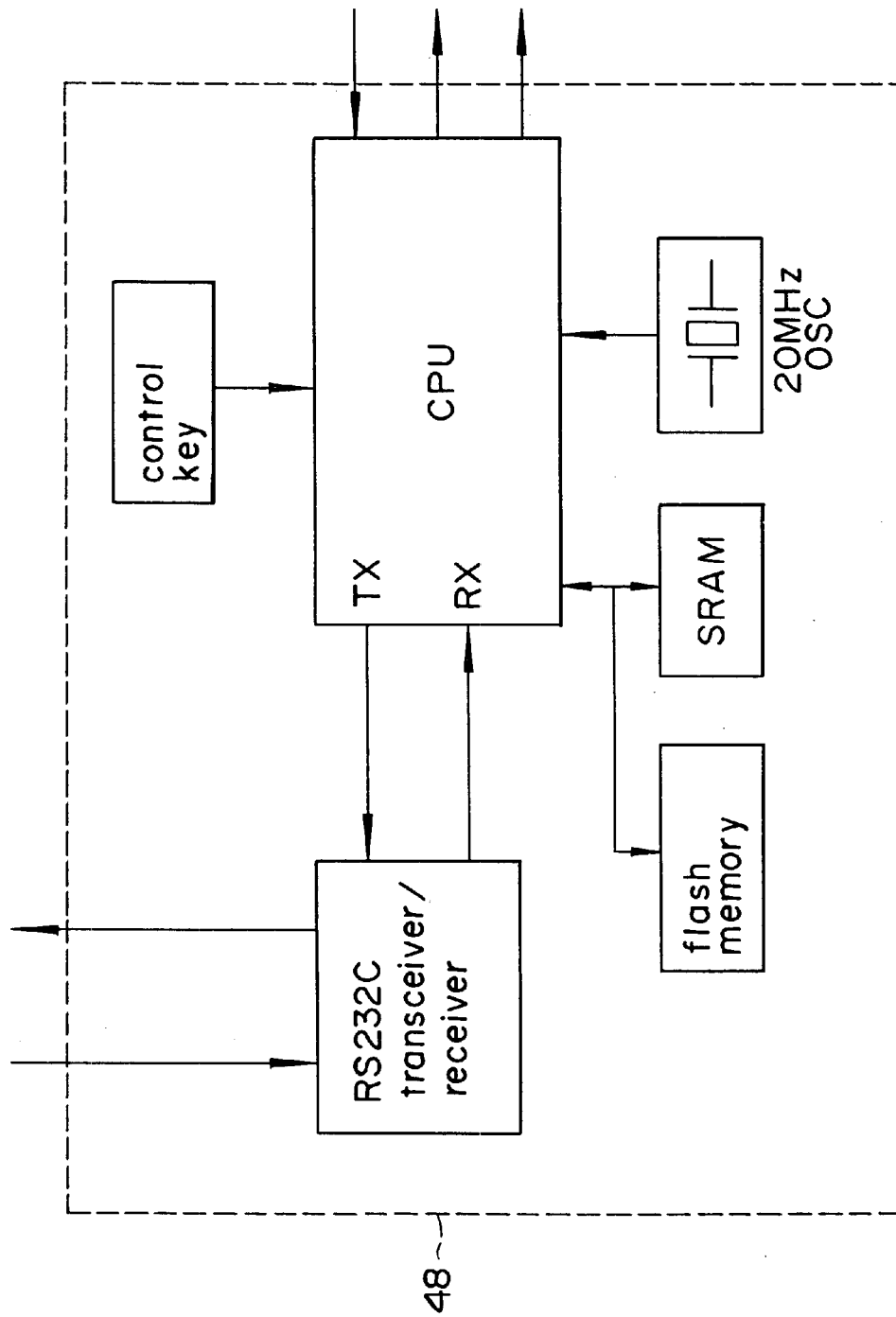

FIG. 11F is a block diagram that shows the concrete composition of the position direction computing section 48. The position direction computing section 48 computes GPS data which are input from the antenna 40 to RS232C transceiver/receiver by CPU, and draws up an image showing position and direction of a boat. The image is output from CPU to the monitor 41.

Figure 11G:
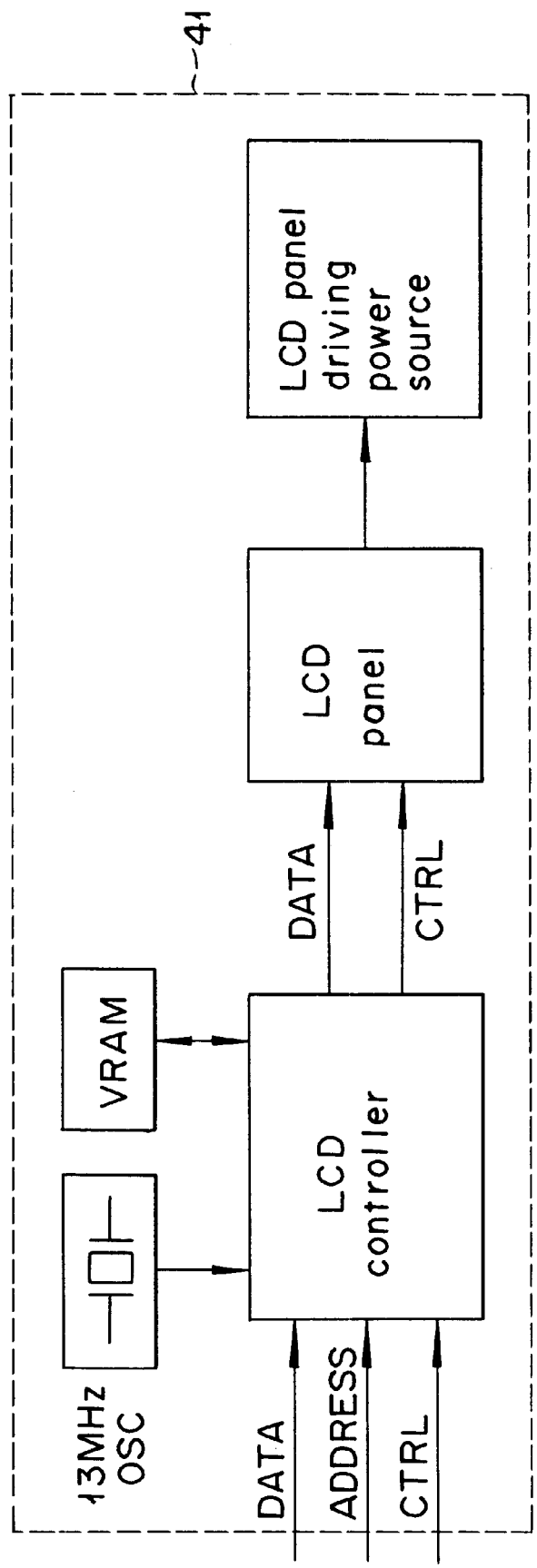

FIG. 11G is a block diagram that shows the concrete composition of the monitor 41. At the monitor 41, image data are input from the position direction computing section 48 to the LCD controller.

The LCD controller controls LCD panel and makes display the position and direction of the boat based on the input image data. Furthermore, LCD controller can make display the moving tracks of boats on the LCD panel.

Normally, wireless LAN is used for data communication between semi-fixed devices indoors (partly between buildings). However, due to the improvement of the communication softwares, the wireless LAN can be utilized for GPS data transmit/receipt between the boat 1 moving on the water surface and the remote control unmanned device 2 apart from the boat 1.

On the other hand, a water temperature sensor for measuring the water temperature may be provided for the boat 1. In this case, an information concerning the water temperature measured by the water temperature sensor can be emitted via the wireless LAN to the remote control device 2 by the water temperature emitting device (not shown). The monitor 41 of the remote control device 2 can display the water temperature based on the information concerning the water temperature received from the boat 1.

Figure 12A:
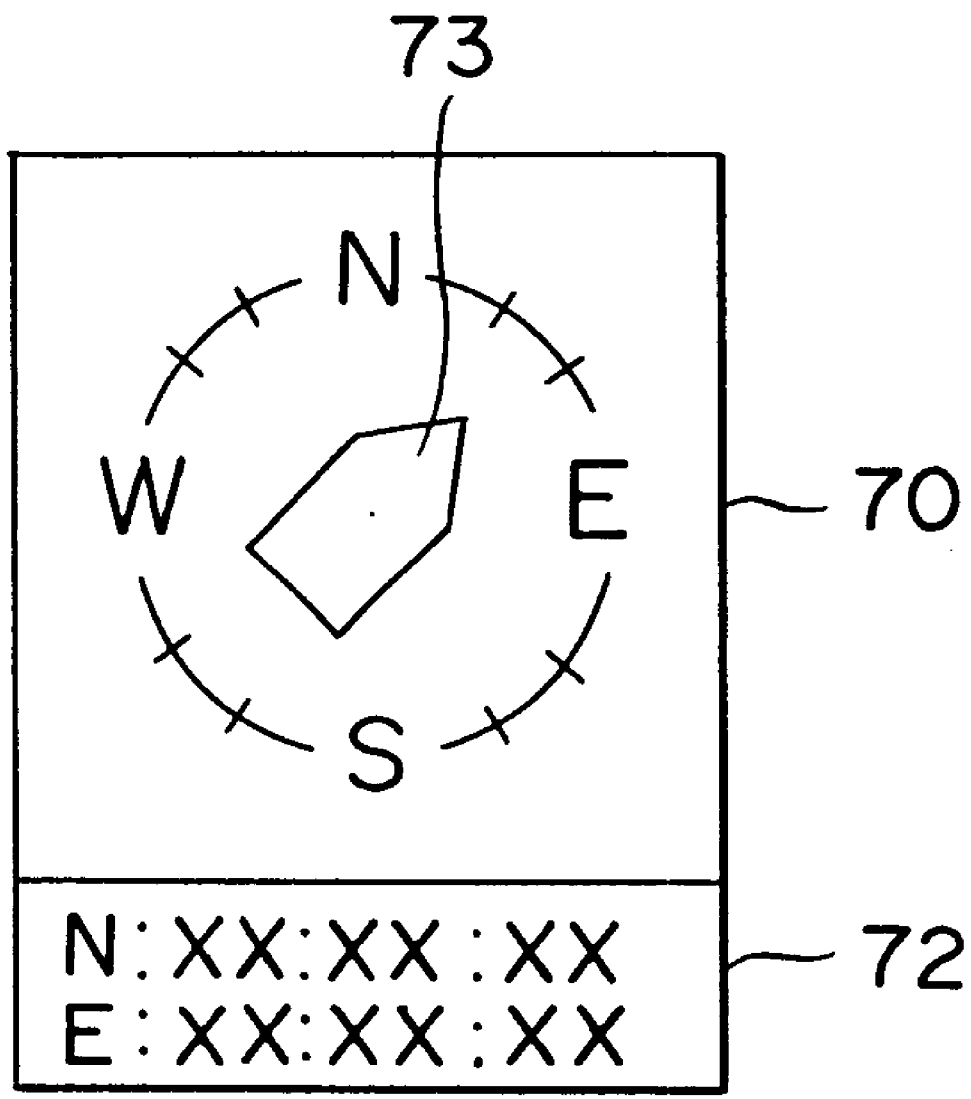
FIGS. 12A and 12B represent an example of the screen depicting the direction of advance and the position as displayed on the monitor.

FIG. 12A depicts an example of the display of the direction of advance and the position on the monitor 41. The display illustrated in FIG. 12A is put up in the left upper section of the screen of the monitor 41 shown in FIG. 7.

The display consists of an orientation display section 70 representing the direction of advance of the boat 1 after the fashion of a compass and a position display section 72 representing the position of the boat 1.

The orientation display section 70 displays the image of a compass and tells the direction of advance of the boat 1 by the orientation of a needle 73. The position display section 72 tells the position of the boat 1 by displaying the latitude and the longitude.

Alternatively, the display on the position display section 72 may be so adapted as to represent the position of the boat 1 on a map by combining the information on the latitude and the longitude as with the information on the map.

Figure 12B:
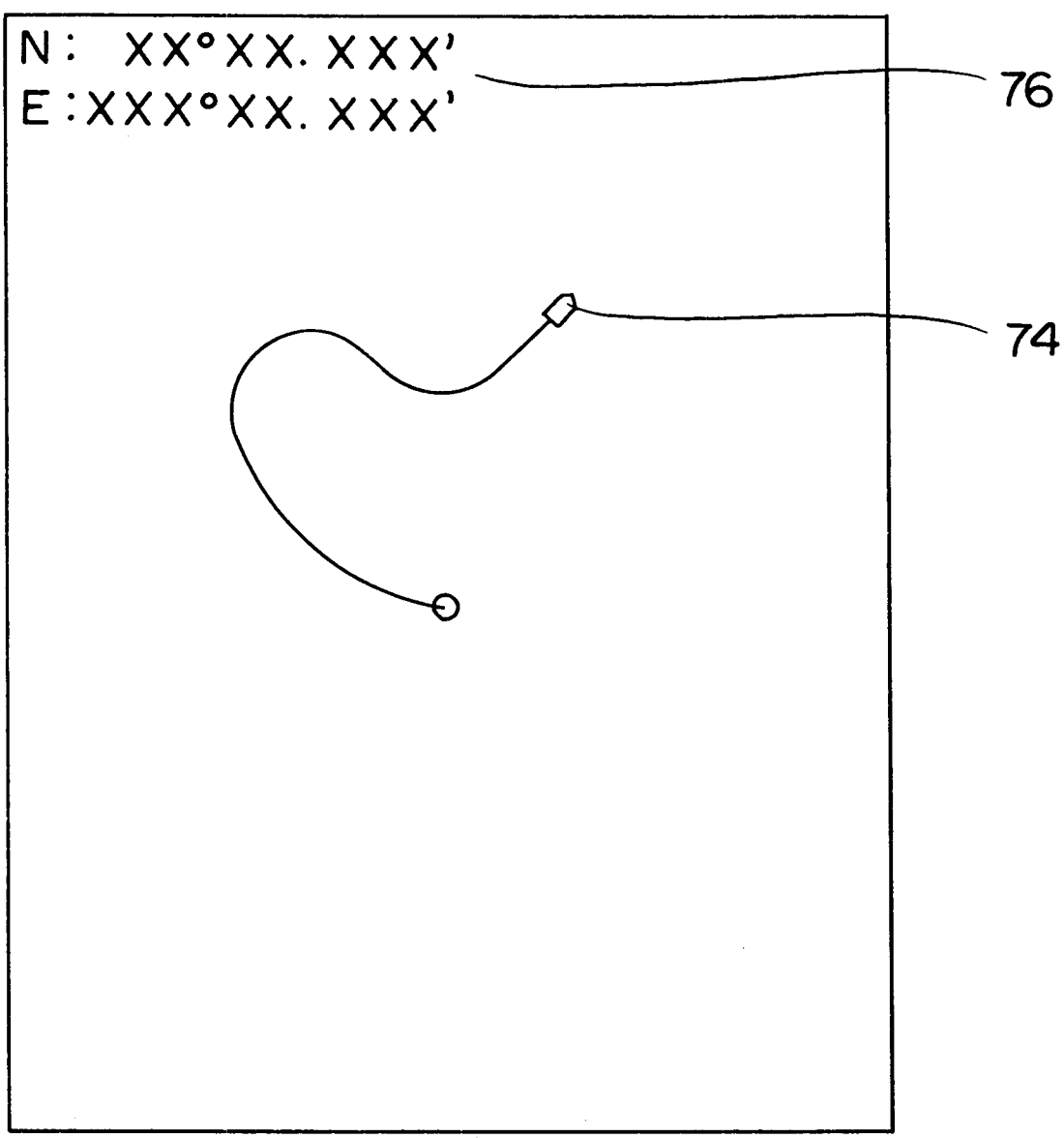

FIG. 12B depicts another example of the display of the direction of advance and the position on the monitor 41. FIG. 12B depicts orientation display section 74 showing the direction of boat 1 and position display section 76 showing the position of boat 1.

At the orientation display section 74, an image tells the position of boat 1 and the direction of advance of boat 1 can be known through the direction of boat 1. The position display section 76 tells the position of the boat 1 by displaying the latitude and the longitude. Orientation display 74 can show also the tracks of boat 1, memorizing and displaying it.

Alternatively, the display on the position display section 76 may be so adapted as to represent the position of the boat 1 on a map by combining the information on the latitude and the longitude as with the information on the map.

Figure 13:
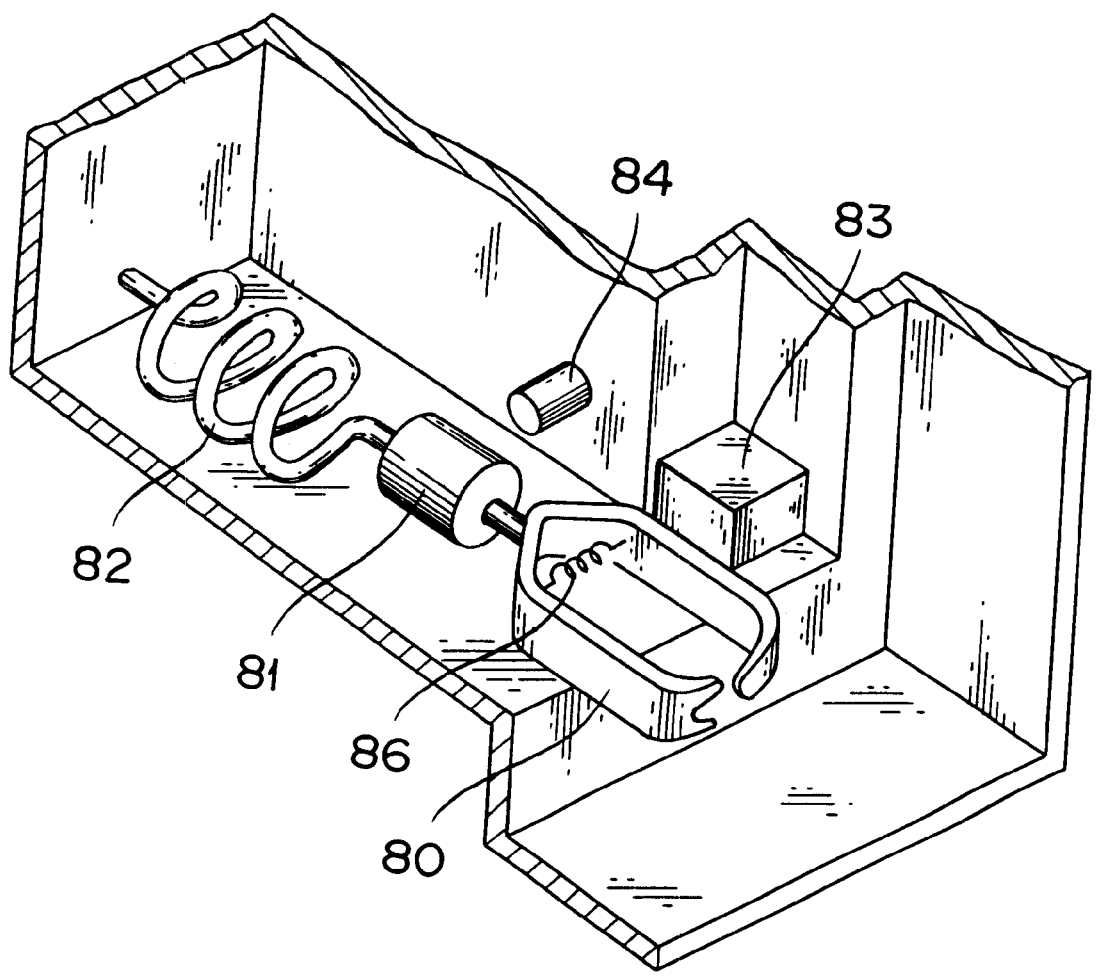
FIG. 13 is a perspective view of a setting device for freely removably setting a fishing line.

FIG. 13 is a perspective view of the setting device 14 for freely detachably setting the fishing line 13.

The setting device 14 is composed of a free open-close hook section 80, a light shielding member 81, a load spring 82, an electromagnet 83, a light emitting element 84, a light receiving section 85, and a spring 86.

The hook section 80 is made of a material which is sensitive to the electromagnet 83. The hook section 80 is retained in a state closed with the spring 86 when the electromagnet 83 is not connected to the power source. While the hook section 80 is in a closed state, the fishing line 13 is not suffered to come off the hook section 80. While the hook section 80 is in an opened state, the fishing line 13 is suffered to come off the hook section 80. The light shielding member 81, while no load is exerted on the load spring 82, assumes a position between the light emitting element 84 and the light receiving section 85 lest the light from the former element should reach the latter element. The load spring 82 has one end thereof fixed to the hull and the other end thereof set to the light shielding member 81.

Figure 14A:
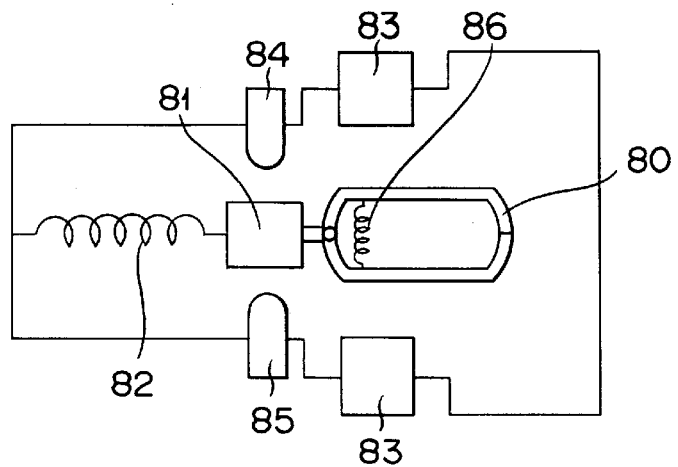
FIG. 14 is a diagram illustrating the action of the setting device, (a) depicting the setting device in the state of waiting, (b) depicting the setting device in the motion of fishing by the use of a fishing lure, and (c) depicting the setting device in the motion of fishing with a fishing line dropped at an arbitrary position.
Figure 14B:
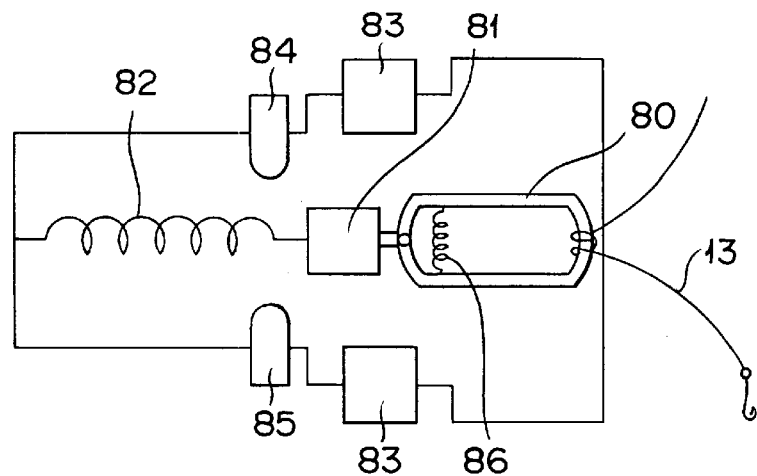
Figure 14C:
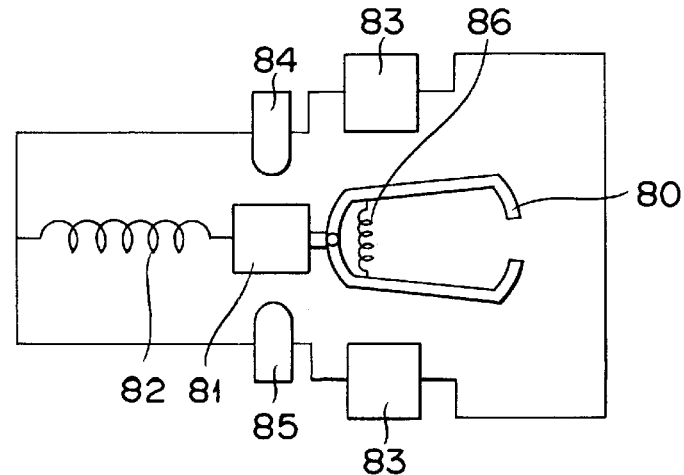

FIGS. 14(*a*), (*b*), and (*c*) are a series of diagrams respectively depicting the actions of the setting device 14.

FIG. 14(*a*) is a diagram illustrating the setting device 14 in the state of waiting.

FIG. 14(*b*) is a diagram illustrating the loading action which the setting device 14 produces when it is used chiefly for lure fishing.

FIG. 14(*c*) is a diagram illustrating the action which the setting device 14 produces when it is used for dropping the fishing line 13 at an arbitrary position.

For a start, the action which the setting device 14 produces in the course of lure fishing will be described with reference to FIGS. 14(*a*) and (*b*).

A lure or a bait is set at the tip of the fishing line 13 and the boat 1 advances while dragging the lure etc. While the fishing line has not hooked any fish and the load spring 82 has not yielded to any load, the light from the light emitting element 84 does not reach the light receiving section 85 because the light shielding member 81 is interposed between the light emitting element 84 and the light receiving section 85 as illustrated in FIG. 14(*a*). The hook section 80 remains in a state closed under the tension of the spring 86 because the electromagnets 83 on the opposite sides have not been connected to the power source.

After the fishing line has caught a fish as on the lure and the load spring 82 has yielded to a load, the light receiving section 85 is fated to expose itself to the light because the light shielding member 81 moves out of the space intervening between the light emitting element 84 and the light receiving section 85. The radio transmitter-receiver 12, on detecting the reception of the light by the light receiving section 85, transmits a signal notifying the remote control device 2 of this detection. The remote control device 2, on receiving the signal by the antenna 40, forwards this signal to the alarm device 49 and induces the alarm device 49 to issue a warning. Alternatively, the alarm device 49 may be connected to the monitor 41 and consequently allowed to display the warning on the screen of the monitor 41.

The action which the setting device 14 produces in dropping the fishing line 13 at an arbitrary position will be described below with reference to FIGS. 14(*a*) and (*c*).

When the fishing line is dropped at an arbitrary place for the purpose of catching fish, it is necessary to set a bait fit for the fishing on the fishing line. Since the rest of the arrangement involved herein is not particularly different from the construction of FIG. 14(*a*), the description of FIG. 14(*a*) will be omitted herein.

Then, preparatory to hanging the fishing line 13 down, the operating button 42 of the remote control device 2 is depressed to emit the relevant signal to the setting device 14 and turn on the power source for the electromagnet 83. When the power source for the electromagnet 83 is turned on, the hook section 80 assumes an opened state in response thereto, with the result that the fishing line 13 will come off the hook section 80 and hung down.

The propelling power source 10 is composed of the battery 18 disposed in the generally central part of the lower section of the hull 3 of the boat 1, and the screw fixed to the exterior of the boat through the medium of a shaft 20 of the motor 19, and the ship bottom cover 5 mentioned above.

Figure 15:
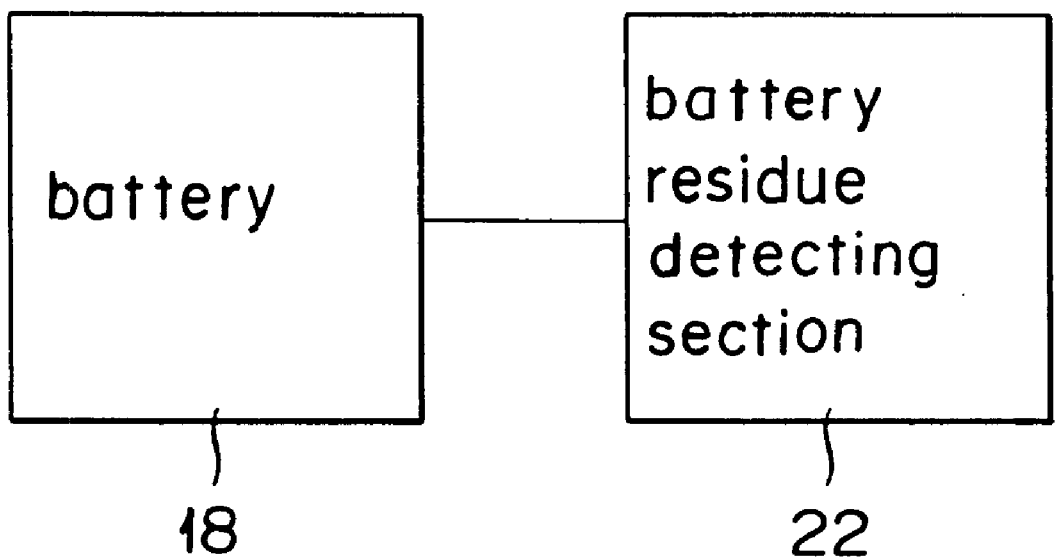
FIG. 15 is a diagram illustrating the construction for detecting the residue of a battery 18.

FIG. 15 is a diagram illustrating the construction for detecting the residue of the charge of the battery 18.

The battery 18 is connected to the battery residue detecting section 22. The battery residue detecting section 22 detects the residue of charge of the battery by detecting the terminal voltage of the battery 18 in the form of the magnitude of resistance and, when the residue reached a fixed standard amount, converts this magnitude into a signal. This signal is transmitted to the remote control device 2 from the radio transmitter-receiver 12. The remote control device 2, on receiving the signal by the antenna 40, forwards this signal to the alarm device 49. The alarm device 49 converts this signal into an image and causes the monitor 41 to display the found residue of the charge of the battery 18. If, in this case, the residue of the charge is less than a fixed standard amount and issue an alarm at the same time.

Now, the operation of the remote control unmanned fishing boat of this invention will be described below.

First, the boat 1 is set floating on the water surface. The operator on the coast or on a ship manipulates the remote control device 2 to move the boat 1.

Propelling the boat requires giving a stated number of depressions to the operating button 42B. As the operating button 42B is depressed, the operating signal is emitted to the transmitting section 45 and the signal of a specific radio wave for actuating the propelling power source 10 is emitted from the transmitting section 45. By this signal of the specific radiowave, the propelling power source 10 is actuated and the boat 1 is advanced.

To be specific, when the operating button 42B is given a stated number of depressions, the remote control device 2 emits the signal for advancing the boat 1. As this signal is received by the radio receiver 9 of the boat 1, the battery 18 sets the motor 19 rotating. This rotation is transmitted via the shaft 20 to the screw 21, which will be set expelling the water surrounding it. At this time, the water is sucked in through the intakes 6 of the ship bottom cover 5 fixed to the lower section of the hull 3 and the water flowing in the direction of the screw 21 is expelled by the screw 21. The expelled water is left flowing backward through the interior of the cylinder of the cylindrical rudder 11 of the steering device 26. The boat 1 is advanced by the reaction of the force which is expelling the water. The advance of the boat 1 is reversed by giving the operating button 42B a fixed number of depressions. Consequently, the direction of rotation of the motor 19 is reversed.

Incidentally, while the boat is in the process of advancing forward or backward, the ship bottom cover 5 fulfills the purpose of preventing such floating matter a s seaweed or dirt or the fishing line from getting caught on the screw 21.

The boat starts being steered by giving the operating button 42C a fixed number of depressions. The operating button 42C, on receiving these depressions, emits an operating signal to the transmitting section 45 and induces the transmitting section 45 to emit a signal of a specific radio wave for actuating the steering device 26. By the signal of this specific radio wave, the steering device 26 is actuated and the cylindrical rudder 11 is laterally rotated to control the direction of advance of the boat 1.

To be specific, when the operating button 42C receives these depressions, the remote control device 2 emits a signal for steering the boat 1 (the signal producing right steering or left steering, depending on the number of depressions given to the operating button 42C). This signal is received by the radio receiver 9 of the boat 1, with the result that the motor 28 will be set rotating by the battery 18. This rotation is transmitted via the gears to the shaft 27 and the cylindrical rudder 11 is slowly rotated laterally by a designated angle. Since the water expelled by the screw 21 is pushed out toward the rear of the boat 1 after flowing through the interior of the cylindrical rudder 11, the boat 1 is steered to a new direction proportionately to the angle of rotation of the cylindrical rudder 11.

When the boat has been brought to the expected place by the manipulation of the operating buttons 42B and 42C, the ultrasonic wave transmitter-receiver 7 is set operating to check out the condition of water bottom and the position of a shoal of fish. This operation is carried out as follows.

The operating button 42A is depressed to set the ultrasonic wave transmitter-receiver 7 operating. When the operating button 42A is depressed, the transmitting section 45 receives an operating signal and the transmitting section 45 emits a signal of a specific radio wave for actuating the ultrasonic wave transmitter-receiver 7. By this signal of the specific radio wave, the ultrasonic wave transmitter-receiver 7 is actuated and made to function as a depth sounder or a detector for a shoal of fish. The ultrasonic wave transmitter-receiver 7 emits the information concerning the condition of water bottom and the position of a shoal of fish consequently determined through the medium of the antenna 29.

The depth sounding section 47 of the remote control device 2 introduces via the antenna 40 the information concerning the condition of water bottom and the position of the shoal of fish determined by the ultrasonic wave transmitter-receiver 7, analyzes the information, and puts up the outcome of the analysis on the monitor 41.

In short, when the ultrasonic wave transmitter-receiver 7 is set operating, the ultrasonic wave transmitter emits ultrasonic wave pulses at intervals of a certain length toward the bottom of a sea or the bottom of a lake, with the result that the ultrasonic wave pulses will be reflected on the bottom of the sea or the bottom of the lake and the reflected ultrasonic wave pulses will be received by the ultrasonic wave receiver. The electric signal intended to transmit ultrasonic waves at intervals of a certain length and the electric signal derived by receiving the ultrasonic wave reflected by the bottom of the sea or the bottom of the lake are transmitted by the radio transmitter 8. These transmitted signals are received by the measuring section 47 of the remote control device 2, the received signals are utilized for computing the depth of water and the position of a shoal of fish, and the results of the computation are displayed on the monitor 41 as illustrated in FIG. 7.

The operator adjusts the position of the boat 1 by manipulating the operating buttons 42B and 42C while viewing the image on the monitor 41 to find the optimum position for fishing. After he has found the optimum position, he stops the boat 1 at the optimum position by depressing the operating button 42B and then removes the fishing line 13 from the setting device 14 by depressing the operating button 42D. Consequently, the fishing line falls down the water.

From the boat 1, signals indicating the position of the boat 1 and the direction of advance of the boat 1 are emitted. The position direction computing section 48 analyzes these signals and the monitor 41 consequently puts up on part of the screen thereof the position of the boat (character display) and the direction thereof (arrow mark display) as illustrated in FIG. 7. Even at night, therefore, the boat 1 can be easily guided to the position occupied by the operator.

As described above, the remote control unmanned fishing boat and the remote control device therefor according to this invention produce the following effects.

Since the various actions of the boat are initiated in consequence of receiving specific radio waves, the boat on the water surface can be advanced forward and backward and permitted to change the direction of its advance by remote control. Owing to the provision of the depth sounder which measures the depth water and find the condition of water bottom, it is made possible to measure the depth of water and find the condition of water bottom.

The boat can be operated at will by transmitting relevant specific radio waves. Further, since the depth of water and the condition of water bottom can be displayed on the monitor, the operator is enabled to find the optimum position for fishing and lower his fishhook to attain effective fishing.

Since the various actions of the boat are initiated in consequence of receiving specific radio waves, the boat on the water surface can be advanced forward and backward and permitted to change the direction of its advance by remote control. Further, the presence of a shoal of fish can be confirmed owing to the provision of the fish shoal detector.

The boat can be operated at will by transmitting relevant specific radio waves. By the monitor which is capable of displaying the position of a shoal of fish, the operator is enabled to find the optimum position for fishing and lower his fishhook to attain effective fishing.

Since the information concerning the direction of advance of the boat can be emitted by a specific radio wave, the operator of the boat can operate the boat even when he has no direct view of the boat.

Since the position of the boat can be detected in addition to the direction of advance of the boat and the information concerning the position can be emitted by a specific radio wave, the operator can operate the boat more precisely even when he has no direct view of the boat.

Since the boat is provided with the indicating lamp, the boat can be visually recognized with ease.

By the lifting handle which is provided in the boat, the boat on the water surface can be easily lifted.

Since the direction of advance of the boat is detected by the use of the rotary compass, it is made possible to detect the general direction of advance easily without requiring use of a complicated device.

Since the information concerning the direction of advance of the boat can be received and displayed on the monitor, the direction of advance of the boat can be visually confirmed accurately. This function, therefore, is utilized conveniently in operating the boat without keeping the boat in direct view.

The direction of advance and the position of the boat can be easily confirmed because the information concerning the direction of advance and the position of the boat is received and displayed on the monitor. The operator, therefore, is enabled to guide the boat to his own position by manipulating the remote control device while keeping an eye on the monitor.

The water can be exclusively introduced into the interior of the ship bottom cover because a plurality of intakes are opened in the front side of the ship bottom cover. The possibility of such dirt as sea weed invading the interior of the ship bottom cover, therefore, is nil.

Since the screw is disposed inside the ship bottom cover, the water introduced through the intakes is expelled in a jet flow from the cylindrical rudder to the exterior of the ship bottom cover. Further, since the cylindrical rudder is freely rotated laterally by the motor, the boat can be steered by rotating the cylindrical rudder and changing the direction of the stream of the expelled water. The possibility of the seaweed and other similar floating matter entangling the screw is nil because the screw is disposed inside the ship bottom cover.

The hook section has a fishing line caught therein and the light shielding member adapted to be moved in the longitudinal direction of the boat in conjunction with the hook section is interposed between the light emitting device and the light receiving device. In the case of drag fishing, therefore, the catch of a fish on the fishhook can be detected by the impingement of light on the light receiving device and the information concerning this detection can be emitted. When the operator elects to drop his fishing line at a suitable place to be found with the aid of the remote control device, the drop of the fishing line can be effected by remote control.

Owing to the reception of the information about the catch of a fish on the fishing line of the boat, the catch of the fish can be displayed on the monitor and shown to the operator and the notification thereof can also be effected by sounding the alarm. The operator, therefore, can be notified visually and audibly of the catch of the fish.

The battery for feeding electric power to the boat is provided with a battery residue detecting section adapted to detect the residue of the charge of the battery and emit the information concerning the residue of the charge as well.

The operator is enabled to confirm visually the residue of the charge of the battery because the information concerning the residue of the charge of the battery can be received and displayed on the monitor. Further, the operator may be warned of the approach of the exhaustion of the charge of the battery by sounding the alarm based on the detected residue of the charge of the battery.

The entire disclosure of Japanese Patent Application Nos. 11-22,708 filed on Jan. 29, 1999 and 11-350,536 filed on Dec. 9, 1999 including specification, claims and summary are incorporated therein by reference in its entirely.

What is claimed is:

1. A remote control unmanned fishing boat intended to effect remote control fishing, comprising:
    a depth sounder for measuring the water depth and finding the condition of water bottom;
    a first transmitter for transmitting by a specific radio wave the information obtained by said depth sounder concerning the depth of water and the condition of water bottom;
    a propelling power source for propelling said boat;
    a steering device for steering said boat;
    a setting device for freely detachably mounting a fishing line, said setting device including
        a hook section capable of being freely opened and closed magnetically and moved in the longitudinal direction of said boat,
        an electromagnet for causing said hook section to be opened and closed,
        a light shielding member adapted to be moved in the longitudinal direction of said boat in conjunction with said hook section,
        an irradiating device and a light receiving device so disposed as to be disabled to effect transfer of light prior to the movement of said light shielding member and enabled to effect transfer of light without being intercepted by said light shielding member subsequent to the movement of said light shielding member, and
        a load transmitting device for transmitting a signal based on the impingement of light on said light receiving device; and
    a first receiver for receiving specific radio waves concerning the operations of said depth sounder, said propelling power source, said steering device, and said setting device and inducing said operations.

2. The remote control device for use with a remote control unmanned fishing boat according to claim 1, comprising:
    a second transmitter for transmitting specific radio waves concerning the operations of said depth sounder, said propelling power source, said steering device, and said setting device to said first receiver;
    an operating signal emitting device for emitting to said second transmitter the operating signals concerning said depth sounder, said propelling power source, said steering device, and said setting device;
    a second receiver for receiving specific radio waves carrying the information transmitted from said first transmitter concerning the depth of water and the condition of water bottom;
    a monitor for displaying thereon the depth of water and the condition of water bottom based on the signals received by said second receiver;
    a third receiver for receiving a signal emitted from said load transfer device concerning the impingement of light on said light receiving device;
    a monitor for displaying thereon the load of said setting device based on the reception of a signal by said third receiver;
    an alarming device for issuing an alarm based on the reception of a signal by said third receiver; and
    a third transmitter for transmitting a signal intended to magnetize said electromagnet.

3. The remote control unmanned fishing boat according to claim 1, wherein said boat is further provided with an advance direction information emitting device for emitting the information concerning the direction of advance of said boat by specific radio waves.

4. The remote control unmanned fishing boat according to claim 3, wherein said advance direction information emitting device comprises:
    a rotary compass freely rotatably supported and having one of the opposite leading terminal parts thereof magnetized for the N pole and the other leading terminal part for the S pole;
    a photoconductor disposed on the lower side of said rotary compass;
    a light source for illuminating said rotary compass and said photoconductor from above; and
    an advance direction detecting device for detecting the direction of advance based on an electric signal from said photoconductor.

5. The remote control device for use with a remote control unmanned fishing boat according to claim 3, wherein said remote control device is provided with an advance direction confirming device for causing said monitor to display thereon the direction of advance of said boat based on the information emitted by said advance direction information emitting device concerning the direction of advance of said boat.

6. The remote control unmanned fishing boat according to claim 1, wherein said boat is further provided with a position information emitting device for emitting the information concerning the position and the direction of advance of said boat by specific radio waves.

7. The remote control device for use with a remote control unmanned fishing boat according to claim 6, wherein said remote control device is provided with an advance direction confirming device for causing said monitor to display thereon the current position of said boat and the direction of advance of said boat based on the information emitted by said advance direction information emitting device concerning the position and the direction of advance of said boat.

8. The remote control unmanned fishing boat according to claim 1, wherein said boat is further provided with an indicating lamp for visually informing the operator of the position of said boat.

9. The remote control unmanned fishing boat according to claim 1, wherein said boat is further provided with a lifting handle for lowering said boat onto the water surface or lifting said boat from the water surface.

10. The remote control unmanned fishing boat according to claim 1, wherein said propelling power source comprises:
    a motor adapted to be driven with a battery;
    a screw disposed outside said boat through the medium of a shaft of said motor; and
    a ship bottom cover so fixed to the lower section of a hull of said boat as to cover said screw and provided in the front section thereof with plural of intakes opened therein.

11. The remote control unmanned fishing boat according to claim 1, wherein said steering device is a cylindrical rudder supported freely rotatably by a shaft of said motor.

12. The remote control unmanned fishing boat according to claim 1, wherein said boat comprises:
- a battery for supplying electric power;
- a voltage detecting section for detecting the voltage of said battery; and
- a battery information transmitting device for transmitting the information concerning the residue of charge of said battery based on the detected voltage of said battery.

13. The remote control device for use with a remote control unmanned fishing boat according to claim 12, wherein said remote control device comprises:
- a battery information receiving device for receiving the information transmitted from said battery information transmitting device concerning the residue of charge of said battery;
- a monitor for displaying thereon the residue of charge of said battery based on the information concerning the residue of charge of said battery; and
- an alarm device for issuing an alarm based on the information concerning the residue of charge of said battery.

14. The remote control unmanned fishing boat according to claim 6, wherein said information concerning the position and the direction of advance of said boat is obtained by using a Global Positioning System.

15. The remote control unmanned fishing boat according to claim 6, wherein said position information emitting device emits said information through a wireless LAN.

16. The remote control unmanned fishing boat according to claim 15, wherein said boat is further provided with a temperature sensor for measuring the water temperature, and a water temperature emitting device for emitting an information concerning the water temperature via said wireless LAN.

17. The remote control device for use with a remote control unmanned fishing boat according to claim 16, wherein said monitor can display the water temperature based on said information concerning the water temperature emitted from said water temperature emitting device.

18. The remote control unmanned fishing boat according to claim 1, wherein said boat is further comprising:
- a soft antenna that is used for sending the said specific radio wave with the said first transmitter, or for receiving the specific. radio wave with the first receiver and;
- a pole that is attachable/detachable to the upper section of the hull, and along which the said antenna can be attached.

19. A remote control unmanned fishing boat intended to effect remote control fishing, comprises:
- a fish shoal detector for detecting a shoal of fish;
- a first transmitter for transmitting by specific radio waves the information concerning the shoal of fish detected by said fish shoal detector;
- a propelling power source for propelling said boat;
- a steering device for steering said boat;
- a setting device for freely detachably mounting a fishing line thereon, including
  - a hook section capable of being freely opened and closed magnetically and moved in the longitudinal direction of said boat,
  - electromagnet for causing said hook section to be opened and closed,
  - a light shielding member adapted to be moved in the longitudinal direction of said boat in conjunction with said hook section,
  - an irradiating device and a light receiving device so disposed as to be disabled to effect transfer of light prior to the movement of said light shielding member and enabled to effect transfer of light without being intercepted by said light shielding member subsequent to the movement of said light shielding member, and
  - a load transmitting device for transmitting a signal based on the impingement of light on said light receiving device; and
- a first receiver for receiving specific radio waves concerning the operations of said fish shoal detector, said propelling power source, said steering device, and said setting device and inducing said operations.

20. The remote control device for use with a remote control unmanned fishing boat according to claim 19, comprising:
- a second transmitter for transmitting specific radio waves concerning the operations of said fish shoal detector, said propelling power source, said steering device, and said setting device to said first receiver;
- an operating signal emitting device for emitting operating signals concerning said fish shoal detector, said propelling power source, said steering device, and said setting device to said second transmitter;
- a second receiver for receiving a specific radio wave carrying the information concerning a shoal of fish transmitted from said first transmitter;
- a monitor for displaying the condition of water bottom and the position of the shoal of fish based on the signal received by said second receiver;
- a third receiver for receiving a signal emitted from said load transfer device concerning the impingement of light on said light receiving device;
- a monitor for displaying thereon the load of said setting device based on the reception of a signal by said third receiver;
- an alarming device for issuing an alarm based on the reception of a signal by said third receiver; and
- a third transmitter for transmitting a signal intended to magnetize said electromagnet.

21. The remote control unmanned fishing boat according to claim 19, wherein said boat is further provided with an advance direction information emitting device for emitting the information concerning the direction of advance of said boat by specific radio waves.

22. The remote control unmanned fishing boat according to claim 21, wherein said advance direction information emitting device comprises:
- a rotary compass freely rotatably supported and having one of the opposite leading terminal parts thereof magnetized for the N pole and the other leading terminal part for the S pole;
- a photoconductor disposed on the lower side of said rotary compass;
- a light source for illuminating said rotary compass and said photoconductor from above; and
- an advance direction detecting device for detecting the direction of advance based on an electric signal from said photoconductor.

23. The remote control device for use with a remote control unmanned fishing boat according to claim 21, wherein said remote control device is provided with an advance direction confirming device for causing said monitor to display thereon the direction of advance of said boat based on the information emitted by said advance direction information emitting device concerning the direction of advance of said boat.

24. The remote control unmanned fishing boat according to claim 19, wherein said boat is further provided with a position information emitting device for emitting the information concerning the position and the direction of advance of said boat by specific radio waves.

25. The remote control device for use with a remote control unmanned fishing boat according to claim 24, wherein said remote control device is provided with an advance direction confirming device for causing said monitor to display thereon the current position of said boat and the direction of advance of said boat based on the information emitted by said advance direction information emitting device concerning the position and the direction of advance of said boat.

26. The remote control unmanned fishing boat according to claim 24, wherein said information concerning the position and the direction of advance of said boat is obtained by using a Global Positioning System.

27. The remote control unmanned fishing boat according to claim 24, wherein said position information emitting device emits said information through a wireless LAN.

28. The remote control unmanned fishing boat according to claim 27, wherein said boat is further provided with a temperature sensor for measuring the water temperature, and a water temperature emitting device for emitting an information concerning the water temperature via said wireless LAN.

29. The remote control device for use with a remote control unmanned fishing boat according to claim 28, wherein said monitor can display the water temperature based on said information concerning the water temperature emitted from said water temperature emitting device.

30. The remote control unmanned fishing boat according to claim 19, wherein said boat is further provided with an indicating lamp for visually informing the operator of the position of said boat.

31. The remote control unmanned fishing boat according to claim 19, wherein said boat is further provided with a lifting handle for lowering said boat onto the water surface or lifting said boat from the water surface.

32. The remote control unmanned fishing boat according to claim 19, wherein said propelling power source comprises:
a motor adapted to be driven with a battery;
a screw disposed outside said boat through the medium of a shaft of said motor; and
a ship bottom cover so fixed to the lower section of a hull of said boat as to cover said screw and provided in the front section thereof with a plurality of intakes opened therein.

33. The remote control unmanned fishing boat according to claim 19, therein said steering device is a cylindrical rudder supported freely rotatably by a shaft of said motor.

34. he remote control unmanned fishing boat according to claim 19, wherein said boat comprises:
a battery for supplying electric power;
a voltage detecting section for detecting the voltage of said battery; and
a battery information transmitting device for transmitting the information concerning the residue of charge of said battery based on the detected voltage of said battery.

35. The remote control device for use with a remote control unmanned fishing boat according to claim 34, wherein said remote control device comprises:
a battery information receiving device for receiving the information transmitted from said battery information transmitting device concerning the residue of charge of said battery;
a monitor for displaying thereon the residue of charge of said battery based on the information concerning the residue of charge of said battery; and
an alarm device for issuing an alarm based on the information concerning the residue of charge of said battery.

36. The remote control unmanned fishing boat according to claim 19, wherein said boat is further comprising:
a soft antenna that is used for sending the said specific radio wave with the said first transmitter, or for receiving the specific radio wave with the first receiver and;
a pole that is attachable/detachable to the upper section of the hull, and along which the said antenna can be attached.

* * * * *